(12) United States Patent
Raciborski et al.

(10) Patent No.: US 6,836,806 B1
(45) Date of Patent: Dec. 28, 2004

(54) SYSTEM FOR NETWORK ADDRESSING

(75) Inventors: Nathan F. Raciborski, Jackson, WY (US); Mark R. Thompson, Phoenix, AZ (US)

(73) Assignee: Aerocast, Inc., San Diego, CA (US)

( * ) Notice: Subject to any disclaimer, the term of this patent is extended or adjusted under 35 U.S.C. 154(b) by 676 days.

(21) Appl. No.: 09/664,179

(22) Filed: Sep. 18, 2000

Related U.S. Application Data

(60) Provisional application No. 60/209,007, filed on Jun. 1, 2000.

(51) Int. Cl.[7] .............................................. G06F 15/16
(52) U.S. Cl. ........................................................ 709/245
(58) Field of Search ................................ 709/245, 219, 709/230–232, 238–244

(56) References Cited

U.S. PATENT DOCUMENTS

| | | | | |
|---|---|---|---|---|
| 5,371,852 A | * | 12/1994 | Attanasio et al. | ........... 709/245 |
| 5,423,002 A | * | 6/1995 | Hart | ........................... 709/249 |
| 5,761,436 A | | 6/1998 | Nielsen | |
| 5,774,660 A | * | 6/1998 | Brendel et al. | ............. 709/201 |
| 5,870,557 A | | 2/1999 | Bellovin et al. | |
| 5,956,716 A | | 9/1999 | Kenner et al. | |
| 5,991,306 A | | 11/1999 | Burns et al. | |
| 5,995,099 A | | 11/1999 | Horstmann | |

(List continued on next page.)

FOREIGN PATENT DOCUMENTS

| | | | | |
|---|---|---|---|---|
| EP | 0837584 A1 | 4/1998 | ........... G06F/17/30 |
| EP | 0847020 A2 | 6/1998 | ........... G06F/17/30 |
| EP | 0877326 A2 | 11/1998 | ........... G06F/17/30 |
| WO | WO 96/42041 A2 | 12/1996 | |
| WO | WO98/17039 | 4/1998 | ........... G06F/17/30 |
| WO | WO98/18076 | 4/1998 | ............. G06F/9/46 |
| WO | WO98/26559 | 6/1998 | ........... H04L/29/12 |
| WO | WO98/37667 | 8/1998 | ........... H04L/12/56 |
| WO | WO98/53410 | 11/1998 | ........... G06F/17/30 |
| WO | WO98/58315 | 12/1998 | ........... G06F/17/30 |
| WO | WO99/03047 | 1/1999 | ........... G06F/17/00 |
| WO | WO99/05584 | 2/1999 | |
| WO | WO 99/30237 A1 | 6/1999 | |
| WO | WO99/31853 | 6/1999 | ........... H04L/29/06 |
| WO | WO99/40514 | 8/1999 | ............. G06F/9/46 |
| WO | WO00/13456 | 3/2000 | ........... H04Q/11/00 |
| WO | WO00/17765 | 3/2000 | ........... G06F/13/14 |
| WO | WO00/28424 | 5/2000 | ........... G06F/13/00 |
| WO | WO 00/73922 | 12/2000 | ........... G06F/17/00 |
| WO | WO 00/74347 | 12/2000 | ........... H04L/29/06 |
| WO | WO 00/79730 | 12/2000 | ........... H04L/12/00 |

OTHER PUBLICATIONS

*How FreeFlow Works* (2 pages), *Content Delivery* (1 page), *FreeFlow Benefits* (1st page only of 2), *Reporting* (1 page) and *Edge Advantage* (1 page), Akamai Technologies, Inc., http://www.akamai.com/htm/sv/code_ffhow.html, Sep. 12, 2000.
*Detail–Rich, Multimedia Streaming Solution*, Mirror Image Internet, Inc., www.morror–image.com, (2 pages).
Simon Burns, *speed Demons*, Far Eastern Economic Review, Apr. 20, 2000, vol. 163, N. 16, p. 2 only of 21.

(List continued on next page.)

*Primary Examiner*—Frantz B. Jean
(74) *Attorney, Agent, or Firm*—Townsend and Townsend and Crew LLP

(57) ABSTRACT

A system relating to distributing content objects to a client computer. One system includes a server, a first content cache, a second content cache and a preference list. The first server is at a first address and the second server is at a second address. The server includes a content object that is copied to the first and second content caches. Originating from a client computer, the preference list includes at least one of the first and second addresses. A multiple address system provides for metadata to be combined with a first location for an object. A port identifier can be added to the address to allow a desired port to be referenced. The port identifier allows a predetermined port to be addressed in response to an inquiry.

17 Claims, 21 Drawing Sheets

U.S. PATENT DOCUMENTS

| | | | |
|---|---|---|---|
| 6,003,030 A | | 12/1999 | Kenner et al. |
| 6,006,264 A | | 12/1999 | Colby et al. |
| 6,023,698 A | | 2/2000 | Lavey, Jr. et al. |
| 6,029,175 A | | 2/2000 | Chow et al. |
| 6,029,200 A | | 2/2000 | Beckerman et al. |
| 6,038,599 A | | 3/2000 | Black et al. |
| 6,052,718 A | | 4/2000 | Gifford |
| 6,055,570 A | | 4/2000 | Nielsen |
| 6,097,882 A | * | 8/2000 | Mogul ........................ 709/201 |
| 6,101,180 A | | 8/2000 | Donahue et al. ............ 370/352 |
| 6,108,703 A | | 8/2000 | Leighton et al. |
| 6,112,239 A | | 8/2000 | Kenner et al. |
| 6,185,598 B1 | | 2/2001 | Farber et al. ............... 709/200 |
| 6,286,006 B1 | | 9/2001 | Bharat et al. |
| 6,311,216 B1 | | 10/2001 | Smith et al. |
| 6,321,242 B1 | | 11/2001 | Fogg et al. |
| 6,330,602 B1 | * | 12/2001 | Law et al. .................. 709/224 |
| 6,345,303 B1 | | 2/2002 | Knauerhase et al. |
| 6,415,327 B1 | | 7/2002 | Beckerman et al. |
| 6,473,406 B1 | * | 10/2002 | Coile et al. ................. 370/248 |
| 2001/0044825 A1 | | 11/2001 | Barnitz |

OTHER PUBLICATIONS

John Dilley et al., *Improving Proxy Cache Performance: Analysis of Three Replacement Policies*, IEEE Internet Computing, (1999) vol. 3, N. 6, pp. 44–50.

Geoff Huston, Telstra, *Web Caching, Cisco Systems, Inc.*, http://www.cisco.com/warp/public/759/ipj_2–3/ipj_2–3_webcaching.html, pp. 1–24.

Geoff Huston, *Internet Performance Survival Guide QoS Strategies for Multiservice Networks*, Wiley Computer Publishing, John Wiley & Sons, Inc., New York, NY, (2000) pp. 255–259, 276277, 449–452.

Allan Leinwand, *A Distributed–Star Overnet For Global Business Applications*, IEEE Globecom 1998, Sydney, Nov. 8–12, 1998, vol. 2, pp. 1291–1296.

Daniel M. Dias, William Kish, Rajat Mukherjee, Renu Tweari; *A Scalable and Highly Available Web Server*, 1063–6390/96 1996 IEEE, Proceedings of Compcon '96.

Larry L. Peterson; *A Yellow–Pages Service for a Local–Area Network*; 1988 Association for Computing Machinery.

Stephane Gruber, Jennifer Rexford, Andea Basso; *Design Considerations for an RTSP–Based Prefix–Caching Proxy for Multimedia Streams*; AT&T Labs Research Technical Memorandum, Sep. 7, 1999.

Online Computer Library Center, Inc. "PURL FAQ", publicty posted Dec. 10, 1997. <http://web.archive.org/web/19971210064138/purl.oclc.org/OCLC/PURL/FAQ>, 19 pages.

Martin F. Arlitt et al., *Internet Web Servers: Workload Characterization and Performance Implications*, IEEE/ACM Transactions on Networking, IEEE Inc., New York, Oct. 1, 1997, vol. 5, No. 5, pp. 631–644.

Luis Abersa et al., *Load Balancing A Cluster Of Web Servers Using Distributed Packet Rewriting*, Computer Science Department Technical Report, New York, NY, Jan. 6, 1999 pp. 1–13.

Clare Bradford et al., *A Bandwidth Friendly Search Engine*, Proceedings Of The International Conference on Multimedia Computing And Systems, Los Alamitos, CA, Jun. 7, 1999, vol. 2, pp. 720–724.

Robert L. Carter et al., *Dynamic Server Selection Using Bandwidth Probing In Wide–area Networks*, Technical Report, Boston University, Mar. 15, 1996, pp. 1–20.

Sandra G. Dykes et al., *An Empirical Evaluation Of Client–side Server Selection Algorithms*, Proceedings IEEE Infocom 2000. The Conference on Computer Communications, $19^{th}$ Annual Joint Conference Of The IEEE Computer And Communications Societies, Tel Aviv, Israel, Mar. 26, 2000, pp. 1361–1370.

Dykes, Sandra G. et al., *Taxonomy and Design Analysis for Distributed Web Caching*, Proceedings of the $32^{nd}$ Annuyal Hawaii International Conference on System Sciences, Maui, HI, Jan. 5–8, 1999, pp. 1–10.

Fan, Li, et al., *Summary Cache: A Scalable Wide–Area Web Cache Sharing Protocol*, Computer Communications Review, Association For Computing Machinery, New York, Oct., 1998, vol. 28, No. 4, pp. 254–265.

Gadde, Syam et al., *A Taste of Crispy Squid*, Proceedings of the Workshop on Internet Service Performance, Jun. 1998, pp. 1–8.

Gadde, Syam et al., *Reduce, Reuse, Recycle, an Approach to Building Large Internet Caches*, The Sixth Workshop on Hot Topics in Cape Cod, MA, May 5–6, 1997, pp. 93–98.

Syam Gadde et al., *Web Caching and Content Distribution: A view From The Interior*, Online Proceedings of the $5^{th}$ International Web Caching and Content Delivery Workshop, retrieved from Internet on Apr. 10, 2002, Abstract, Sections 1 and 2.

Gulwani, Sumit et al. *WebCaL—A Domain Specific Language For Web Caching*, Online Proceedings Of The $5^{th}$ International Web Caching And Content Delivery Workshop, at<http://www.terena.nl/conf/wcw/Proceedings/S2/S2–4.ps>, May, 2002.

Gwertzman, James et al., *An Analysis Of Geographical Push–Caching*, Harvard University, Vino Research Group, World Wide Web Research at <http://www.eecs.harvard.edu/vino/web/server.cache/icdcs.ps> Mar. 28, 2002.

Inohara, Shigekazu et al., *Self–Organizing Cooperative WWW Caching*, Proceedings. $18^{th}$ International Conference on Amsterdam, Netherlands, May 26–29, 1998, pp. 74–83.

Kanchanasut, Kanchana, *The A13 CacheBone Project*, Internet Project Workshop, IWS 99 Osaka, Japan, Feb. 18–20, 1999, pp. 203–208.

Kangasharju, Jussi et al., *Locating Copies of Ojbects Using the Domain Name System*, Proceedings of the $4^{th}$ International Caching Workshop, 1999, pp. 1–12.

Kangashaju, Jussi et al., *Performance Evaluation of Redirection Schemes in Content Distribution Networks*, Online Proceedings of the $5^{th}$ International Web Caching and Content Delivery Workshop, May, 2000, pp. 1–12.

Antoine Mourad, et al., *Scalable Web Server Architectures*, Proceedings IEEE International Symposium On Computers and Communications, Jul. 1, 1997, pp. 12–16.

Rousskov, Alex et al., *Cache Digests, Computer Networks and ISDN Systems*, North Holland Publishing, Amsterdam, NL, Nov. 25, 1998, vol. 30, No. 22–23, pp. 2155–2168.

Tewari, Renu et al., *Beyond Hierarchies: Design Considerations for Distributed Caching On The Internet*, UTCS Technical Report, Feb., 1998, pp. 1–22.

Touch, Joseph D., *Defining High–Speed Protocols: Five Challenges And An Example That Survives The Challenges*, IEEE Journal On Selected Areas In Communications, IEEE Inc., New York, Jun. 1, 1995, vol. 13, No. 5, pp. 828–835.

Sun Wu et al., *Virtual Proxy Servers For WWW And Intelligent Agents On The Internet, System Sciences, 1997, Proceedings Of The Thirtieth Hwaii International Conference On Wailea, HI*, Los Alamitors, CA, Jan. 7, 1997, pp. 200–209.

Chad Yoshikawa et al., *Using Smart Clients To Build Scalable Services, Proceedings Of The Usenix 1997 Annual Technical Conference, Proceedings of Usenix 1997 Annual Technical Conference*, Anaheim, CA, Jan. 6–10, 1997 pp. 105–117.

Zhang, Xiaolan et al., *HACC: A Architecture For Cluster-Based Web Servers, Proceedings Of The $3^{rd}$ Usenix Windows NT Symposium*, Seattle, WA, Jul. 12–15, 1999, pp. 155–164.

* cited by examiner

HTTP://204.162.80.181/PCN_000.80/FOO.DAT

SYSTEM FOR NETWORK ADDRESSING

CROSS-REFERENCES TO RELATED APPLICATIONS

This application claims the benefit of U.S. Provisional Application No. 60/209,007 filed on Jun. 1, 2000.

This application is being filed concurrently with related U.S. patent applications: Ser. No. 09/665,204, entitled "A QOS BASED CONTENT DISTRIBUTION NETWORK", Ser. No. 09/665,205, entitled "CONTENT MANAGER"; Ser. No. 09/664,148, entitled "VIEWER OBJECT PROXY"; Ser. No. 09/664,147, entitled "CONTENT TRACKING"; Ser. No. 09/665,203, entitled "ACTIVE DIRECTORY FOR CONTENT OBJECTS"; Ser. No. 09/664,139, entitled "Method for Providing Multiple Addresses"; Ser. No. 09/664,036, entitled "CLIENT SIDE DETERMINISTIC ROUTING AND TRANSPARENT REDIRECTION"; Ser. No. 09/664,509, entitled "SELECTIVE ROUTING"; Ser. No. 09/663,555, entitled "CLIENT SIDE HOLISTIC HEALTH CHECK"; Ser. No. 09/664,037, entitled "CLIENT SIDE ADDRESS ROUTING ANALYSIS"; Ser. No. 09/664,294, entitled "SELF-PUBLISHING NETWORK DIRECTORY"; Ser. No. 09/663,551, entitled "RESIZABLE GRAPHICAL USER INTERFACE"; Ser. No. 09/663,554, entitled "REVERSE CONTENT HARVESTER"; all of which are incorporated herein by reference.

BACKGROUND

This invention relates generally to systems for providing addresses used on the Internet. More specifically, the invention relates to methods for configuring address information so as to provide multiple sources for an object of interest.

Traditional forms of addressing objects such as web pages, documents to download, and movie files to stream, have utilized a static format or protocol in which only a single location for an object is indicated by the address format. Thus, locating an object rests on the object still being located at the address specified by the static format. However, often times, particularly in the case of the Internet, an object will only reside at a specific address for a period of time. After that period of time, the object may be removed from that particular address. Thus, someone attempting to locate the object at that address often receives an error message indicating that the address is no longer accessible or that the object is not available.

Furthermore, such an address indicates a single location for an object. However, the information or content of an object can reside at multiple places, especially on the Internet, where an object, e.g., a movie file, can reside at multiple servers. Thus because the static format for addressing an object only allows addressing an object at one of those multiple locations, when the object is removed from the addressed location, a user no longer is able to access the object with the given address.

SUMMARY

In one embodiment of the invention, an address comprising a protocol identifier is utilized along with a port identifier. The address and port identifier are coupled to form a single address string.

In another embodiment of the invention, a data structure is provided. The data structure provides a protocol identifier field, an IP identifier field, a server identifier field, a server port field, and a file designation field.

In yet another embodiment of the invention, a port identifier is provided by a requestor as part of an address, the address is transmitted to an intermediate device, the intermediate device transmits the port identifier to a data provider device, and the data provider device addresses the requestor by utilizing the port identifier.

DESCRIPTION

The present invention provides a system for implementing an addressing scheme which provides a dynamic method of addressing an object on a network. In one embodiment the method provides for a first address to be combined with metadata about the object so as to form a third address which also is capable of addressing the same object. The invention lends itself to implementation in a wide variety of settings. One such setting is in the delivery of video content on the Internet. Thus, to provide a setting for the implementation of the invention, a system will first be described which can utilize the various embodiments of the invention. Then, the addressing system will be explained in greater detail.

Figure 1:
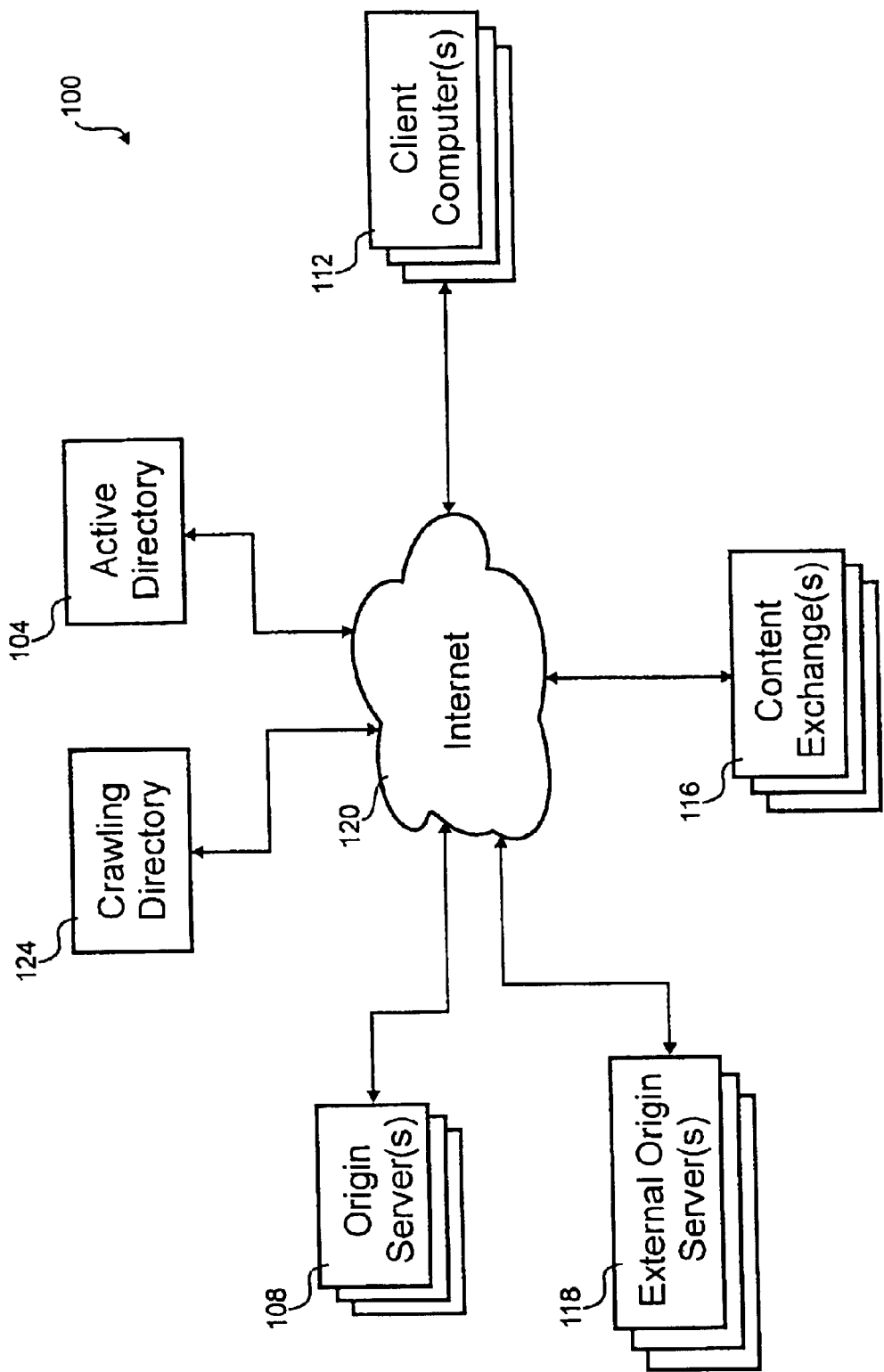
FIG. 1 is a block diagram of an embodiment of a content distribution system.

Referring to FIG. 1, a block diagram of an embodiment of a content distribution system 100 is shown. In this embodiment, the content distribution system 100 includes an active directory 104, one or more origin servers 108, one or more client computers 112, one or more content exchanges 116, one or more external origin servers 118, the Internet 120 and a crawling directory 124. A particular client computer 112 interacts with the active directory 104 to select a content object for download. The object can be played during download if it is streaming media or can be stored for a later time. The content object could be any type of information, such as audio, video or data, that is available for download from a network. The request for the content object is forwarded to the appropriate origin server 108 along with preference information from the client computer 112. The origin server 108 decides where the object is downloaded from. In order to provide sufficient QOS, any of the content exchanges 116 or even the origin server 108 itself could provide the object.

The active directory 104 can be the interface to the client computer 112 for selecting a content object. Software for both the origin server 108 and optionally for the client computer 112 can be downloaded from the active directory 104 to enable the content distribution system 100. Either a directory interface page or a search interface page may be used to determine the content object desired. The interfaces are maintained in an active manner to avoid broken links to content objects on the origin servers 108. When a content object is needed from the origin server 108 by a content exchange 116, the active directory 104 can provide a path back to the proper origin server 108.

Other embodiments could have multiple active directories. Users of the system could be divided amongst the several active directories to distribute the loading. Additionally, the other active directories could be used for redundancy such that if one active directory were offline, the others would absorb the loading.

In some embodiments, the origin server 108 provides the source of a content object, directs a user to a preferred source of the content object and provides directory information to the active directory 104. Content objects are introduced to the system 100 by origin servers 108. Introduction involves selection by an origin server administrator of the content objects to make available to the active directory 104. The administrator is person or system that manages the origin server 108. The content objects could include previously stored information or a streaming feed of information. According to a predetermined cycle, the origin server 108 provides a catalog of the selected information that is updated as the content on the origin server 108 changes.

The origin server 108 determines the preferred source to direct the client computer 112 to in order to download the content object. The preference list of the client computer 112, the loading of the content exchanges and the location of copies of the content object are all considerations of the origin server 108 in redirecting the client computer to the preferred source of the information. That source could be the origin server 108 itself or one of the content exchanges 116.

The user directs the client computer 112 to find the desired content object and subsequently download that object. Using viewer object proxy software downloaded from the active directory 104, the client computer 112 determines the content exchanges 116 that can deliver content with the adequate QOS. The process of determining a content exchange 116 with adequate QOS involves, for example, receiving test information from the content exchanges that are likely to produce the best results in preparing a preferred list. The user can modify the preferred list of content exchanges 116 if a customized approach is desired. When the origin server 108 is deciding the source of the content object, the preference information is used to provide adequate QOS.

The external origin servers 118 can be additional sources of content objects available to the client computer 112. In an embodiment, external origin servers 118 are coupled to a content exchange 116.

The content exchanges 116 are caches for content objects. A number of these content exchanges 116 are distributed to different points of the Internet 120 to cache content objects. Information can be cached based upon a number of considerations, such as the desirability of information to users, as a service to origin servers 108 who want their content readily available to users, or as a service to users who want improved QOS. Grouping of the content exchanges 116 could be in clusters or individually to service the demand of client computers 112 for content objects.

When a requested content object or part of a requested content object is not found by a user requesting it from a content exchange 116, a request by the content exchange 116 to other content exchanges is made for that content object. If no other content exchanges 116 have the content object, the active directory 104 is queried for the origin server 108 who is the source of the content object and the content object is downloaded from there. While the content exchange 116 is gathering the content object, the client computer 112 is receiving the initial portions that are available. The content object could be stored in pieces on several content exchanges 116 and the requesting content exchange 116 will retrieve those pieces to reassemble the whole content object as needed by the client computer 112.

In some embodiments, when a requested content object or part of a requested content object is not found by a user requesting it from a content exchange 116, a request by the content exchange 116 to an external origin server 118 can be made retrieve the requested content object.

A crawling directory 124 is used to supplement the catalog information reported by the origin servers 108. When searching for content objects for a user, the active directory 104 could display content objects available from the origin servers 108 and other content objects uncovered by the crawling directory 124. By traversing the web, crawling directories 124 catalog the content objects and other information they encounter. For example, a keyword search of the catalog can direct the user to a content object not available from any origin server on the system 100. One of the content exchanges 116 could be selected by the active directory 104 to cache the content object as the client computer 112 downloads it. Although only one crawling directory 124 is used in this embodiment, other embodiments could use a number of crawling directories to offer additional search results.

The Internet 120 is comprised of servers linked together by routers. Data is divided into packets that travel through the Internet 120 by hopping from one router to the next until the destination is reached. Each packet may take a different route through the Internet and arrive at the destination at a different time. Additionally, some packets can be lost during travel through the Internet 120 as the bandwidth of any router saturates. As the number of hops between the source of a content object and the destination increases, so does the likelihood of excessive delay and packet loss.

As the content object traverses a path from source to destination through the Internet 120, the smallest bandwidth between any two routers in the path defines the maximum bandwidth of that path. Generally, the bandwidth from the Internet 120 to the client computer has the least bandwidth allocation. At other times, some other hop between routers has the smallest bandwidth. Caching the content object in a content exchange 116 with a minimal amount of hops between the content exchange 116 and the client computer 112 improves the likelihood of adequate QOS.

Downloading the content object at a desired data-rate that does not exceed the data-rate of the client computer to the Internet 120 is adequate QOS. The maximum QOS a user can expect is defined by the speed of their network connection, the processing power of their computer and other factors. The minimum QOS is subjectively defined by the user based upon the quality they desire within certain limits. For example, a user with a 400 Kbps network connection and a fast computer may have a choice of a 28 Kbps, 56 Kbps, or 128 Kbps stream for an audio clip from which the user chooses the 128 Kbps stream. So long as the datarate provided by the client computer is in the range of 128–400 Kbps, adequate QOS is possible for that stream.

Although the above embodiment primarily uses the Internet 120 to connection between the various blocks, other embodiments could use private links outside the Internet 120. Additionally, content objects outside the system 100 could benefit from the system 100 to the extent caching, encryption and compression is provided.

Figure 2:
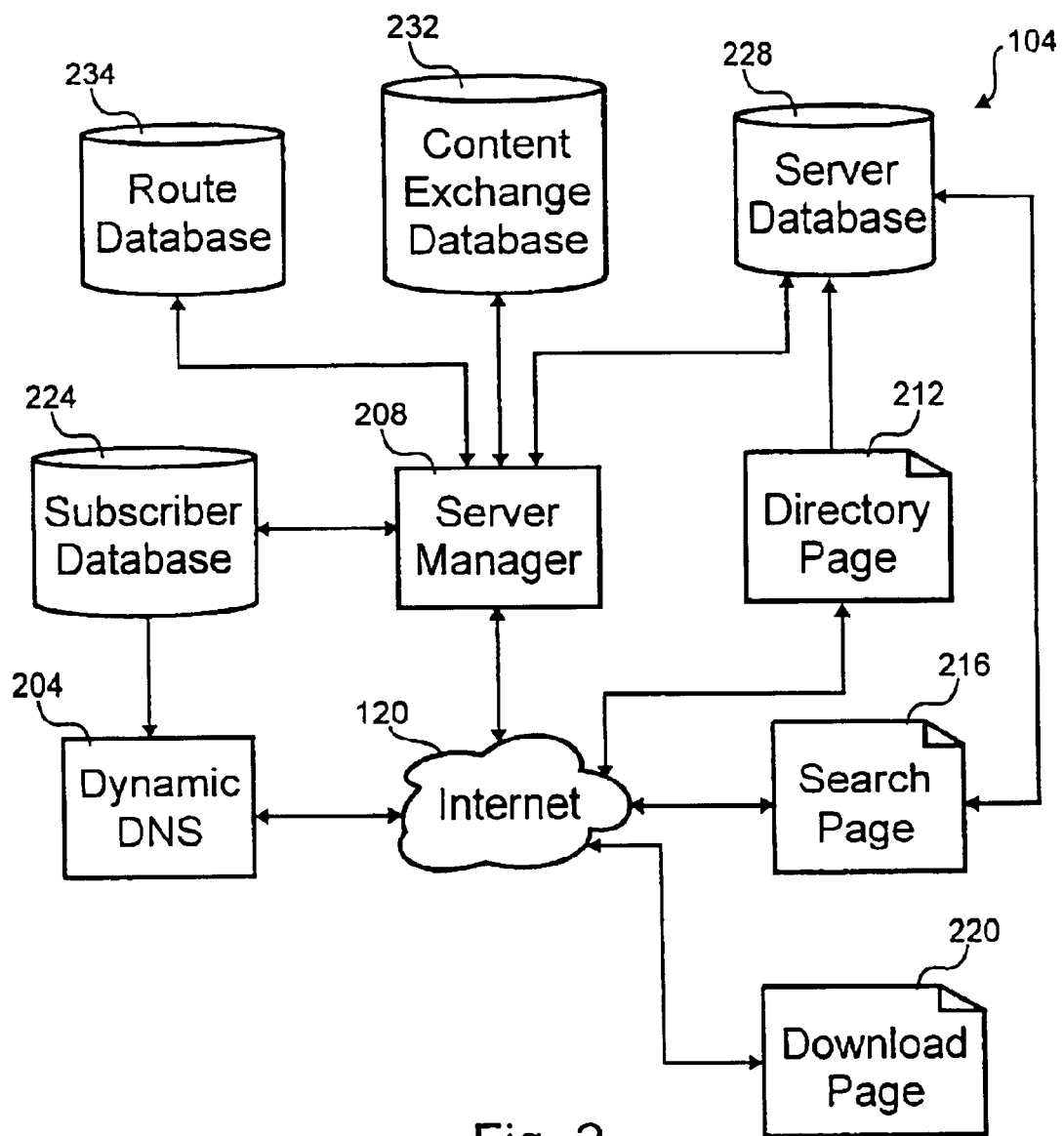
FIG. 2 is a block diagram of an embodiment of an active directory portion of the content distribution system.

With reference to FIG. 2, a block diagram of an embodiment of an active directory portion 104 of the content distribution system 100 is shown. Included in the active directory 104 are a dynamic domain name server (DNS) 204, a server manager 208, a directory page 212, a search page 216, a download page 220, a subscriber database 224, a server database 228, a content exchange database 232, and a route database 234. The content distribution system 100 interacts with the active directory 104 to provide directory information to the user and assist in downloading a content object to the user.

Both the user of the client computer 112 and the administrator of the origin server 108 are subscribers to the content distribution system 100. Software is downloaded from a download page to the user and/or administrator. The software for the client computer 112 is optional in some embodiments and improves QOS. The software for the origin server 108 allows the active directory 104 to update the content available on the system 100 and to direct the client computer 112 to a preferred source for receiving that content.

The client computer 112 attaches to the domain of the active directory 104 to find a desired content object. Depending on preference, the user may use a directory page 212 or search page 216 to find the content object. The search page 216 may be a traditional boolean search engine that accesses a catalog of the content objects provided by all origin servers 108 as well as information gathered from the crawling directory 124. Other embodiments could only display information from the crawling directory 124 after a search of the content from the origin servers 108 is unsuccessful or omit information from the crawling directory 124 altogether. The catalog of content objects for all origin servers 108 is maintained in the server database 228.

The directory page 212 organizes the possible content objects in a hierarchy of categories that are organized by subject. For example, the first page might show a number of topics of general interest where the user selects sports. In the next page, which is one level down in the hierarchy, a number of sports are displayed where the user selects football. Down another level in the hierarchy, the user may select the San Diego Chargers™ to see another page of related content object links.

The administrator categorizes the content on the origin server 108 to allow the directory page 212 to present it properly. On a site, directory or file basis, the administrator can choose a category for content objects in an HTML SSI tag associated with that content object. This classification is harvested and stored on the active directory to allow presenting content objects in different categories. Additionally, a moderator may describe and arrange content objects in the categories for the directory page 212. For example, the moderator could mark certain content objects for more prominent display and/or add a review for the content object.

The server manager 208 maintains information on all client computers 112, all origin servers 108, all external origin servers 118, all content exchanges 116, and all content objects on origin servers 108. The information related to client computers 112 and origin servers 108 is maintained in the subscriber database 224. The full name, a login name, a password, a unique identifier, token credits available, and other information is maintained in the subscriber database 224 for each user associated with a client computer 112. This database 224 also holds the last time the origin server 108 was verified, an Internet Protocol (IP) address for the origin server 108, the port the content manager server runs upon, on-/offline status of the origin server 108, a banner ad URL, a name for the origin server 108, a description of the origin server 108, the credits or tokens needed to use the origin server 108 or other billing model, and the number of connections or viewers allowed at one time.

Information on content objects for all origin servers 108 is maintained in the server database 228. For each content object, the origin server name, content object file name and path are stored along with category information, a brief description and keywords. The server database 228 is queried to provide content selections to the user during navigation of the directory and search pages 212, 216. To maintain current information in the server database 228, the server manager 208 periodically interacts with the origin server 108 to get the most recent changes to the catalog of content objects and to determine if the origin server 108 has gone offline. Whenever an origin server 108 goes offline, the entries in the server database 228 corresponding to that origin server 108 are removed and the status information in the subscriber database 224 is updated.

In some embodiments, the entries in the server database 228 remain even after the origin server 108 goes offline. The status is updated to reflect that the content associated with the origin server is unavailable, but the information remains stored in the server database 228. If the status is updated to online, the information is once again presented to users that are searching for content objects. In some circumstances, an origin server 108 may indicate to the active directory 104 that it is going offline for a period of time. Presuming the period of time is short, the active directory can keep information in the server database 228 without presenting it to users.

A list of the content exchanges 116 available to the system 100 is maintained by the server manager 208 in the content exchange database 232. In some embodiments, the content exchange database 232 can include a list of IP addresses for all possible content exchanges 116 within the content distribution system 100. Further, the content exchange database 232 can include a number of content exchange fields associated with each content exchange 116. For example, fields associated with each content exchange 116 in the content exchange database 232 can include a content exchange identifier, a content exchange site, a content exchange provider, a content exchange name, a content exchange location, a content exchange status, an icon, or any other desired or needed information.

Together, the content exchange identifier and content exchange site identify a unique content exchange 116 at a particular content exchange site. The content exchange provider is an indicator of the party responsible for the content exchange, such as XYZ company. The content name is a domain name and the content exchange location can be geographic coordinates for a content exchange 116. In an exemplary embodiment, the content exchange database 232 includes a content exchange identifier, a content exchange site, a content exchange IP address, a content exchange provider, a content exchange name, a content exchange location, and an icon for each content exchange 116 in the content exchange database 232.

In general, the content exchange database 232 can be regionalized or partitioned by a variety of methods including, but not limited to, improved QOS criteria or subscription services criteria. Additionally, the content exchange database 232 can include a listing of alternative active directories 104, origin servers 108, or any other useful or necessary information.

The content exchanges 116 in the system 100 regularly provide status to the server manager 208. As content exchanges 116 become available or unavailable, their operational status is reported to the server manager 208 and recorded in the content exchange database 232. In some embodiments, the content exchange database 232 can include additional status information including content exchange 116 loading, capacity, utilization, and health.

The routing database 234 includes a list of external origin servers 118. In some embodiments, the routing database 234 includes identification, status and organization information related to the external origin servers 118. Identification information can include an IP address and a domain name for an external origin server 118. Status information can include availability, loading or other status about the external origin server. Organization information can include a list of alternative external origin servers 118. In an embodiment, the routing database 234 includes an IP address and a domain name for each external origin server 118. In some embodiments, identifying an external origin server 118 in the routing database 234 is the mechanism for associating the external origin server 118 with the content distribution system 100.

For each external origin server 118 in the routing database, there are a list of user names that are allowed to use a content exchange 116 to access the information on the external origin server 118. The user name is unique to the user of the client computer 112. A list of external origin servers 118 a client computer can route through a content exchange is provided to the client computer 112. The client computer 112 uses the information from the routing database to redirect user requests for an external origin server 118 to a content exchange 116. After the content exchange 116 populates with the content objects from the external origin server 118, bandwidth is offloaded from the external origin server 118 to the content exchange 116. The user may pay the owner of the content exchange and/or the administrator of the origin server for this enhanced service.

The dynamic DNS 204 provides an origin server name for each IP address for the origin servers 108. The origin server name uniquely identifies the origin server 108 on the Internet 120. This information is maintained in the subscriber database 224. The content exchange 116 does not know the IP address of the origin server 108 that provided the content object to the content exchange 116, but knows the origin server name. When a content exchange 116 wants to populate its cache with a content object or a portion of a content object that is not available from other content exchanges 116, the dynamic DNS 204 is queried to determine the IP address or domain name of the origin server 108 that is the source of the content object. If a domain name is retrieved from the dynamic DNS 204 the IP address corresponding to that domain name is retrieved from a DNS.

Figure 3A:
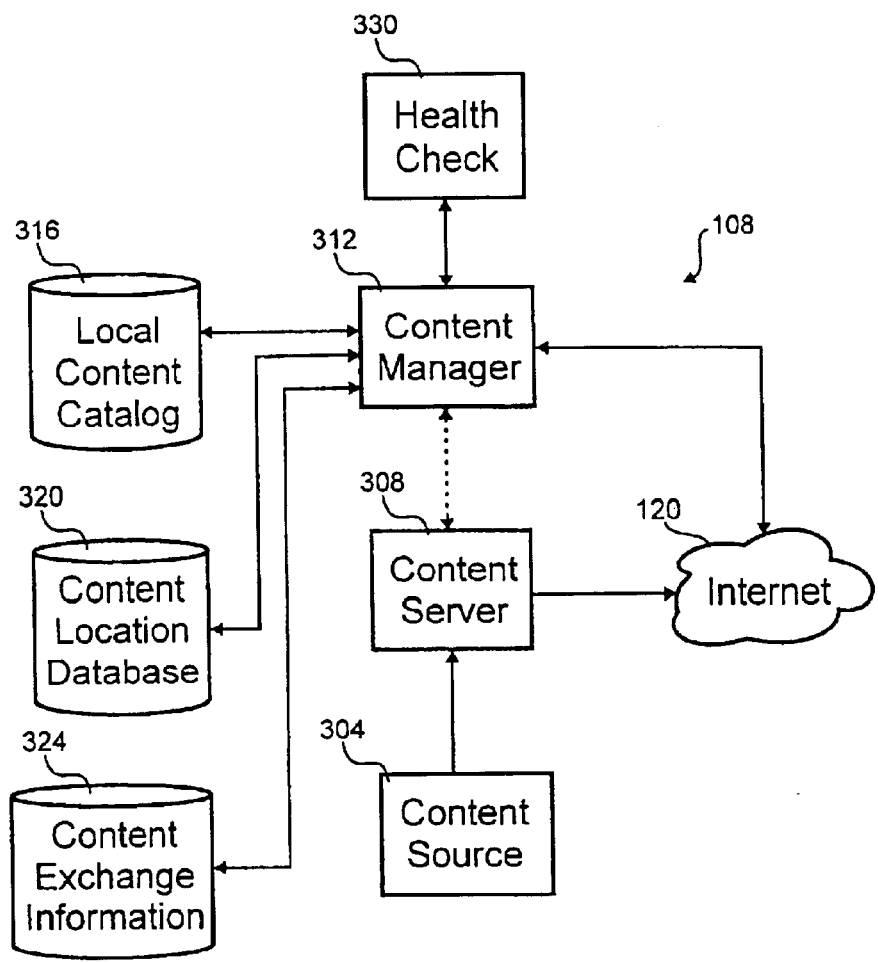
FIG. 3A is a block diagram of an embodiment of an origin server portion of the content distribution system.

Referring next to FIG. 3A, a block diagram of an embodiment of an origin server portion 108 of the content distribution system 100 is shown. The origin server 108 is managed by an administrator and provides one source of content objects to the content distribution system 100. QOS is provided by the origin server 108 directing the client computer to a content exchange 116 that can efficiently deliver the desired content object. Included in the origin server 108 are a content source 304, a content server 308, a content manager 312, a local content catalog 316, a content location database 320, content exchange information 324, and a health check 330.

Content is provided to the origin server 108 by a content source 304. The content source 304 could be a live web cam, a video or audio feed, a data object, a data stream, a video tape or audio tape, an optical or magnetic disk, or any other content delivery mechanism. Content objects are delivered by the content source 304 to the content server 308 for possible distribution to the system 100.

Time and date information is maintained in each content exchange 116 for the content objects or portions of content objects maintained therein. The time and date information allows distinguishing content objects which may have the same origin sever name, path name and file name. Other embodiments could use any unique code such as a checksum, CRC or hash to uniquely identify a content object.

All content objects of the origin server 308 are stored on the content server 308. The administrator can select a content object or groups of content objects for publishing to the system 100 while leaving other content objects on the content server 308 that are unavailable to the system 100. Some content objects are discreet files, but others are streams of content produced, for example, by live web cams. The software that runs the content server 308 may be integrated with the software of the content manager 312.

The content manager 312 publishes the desired content objects to the system 100 and directs users to the preferred content exchange 116 for downloading content objects associated with the content manager 312. At the direction of the administrator, the content manager 312 selects content objects or groups of content objects by filename, directory or drive volume for publishing to the active directory 104. Some content objects on the content server 308 may be excluded from publishing such that they are not available to the system 100.

The content objects selected for publishing to the system are maintained in a local content catalog 316. Entries in the local content catalog 316 are kept current by the content manager 312 as the objects corresponding to those entries may become unavailable or updated. For each entry, the content object file name and path are stored along with category information, a brief description and keywords. Upon attachment to the system 100, the local content catalog 316 is sent by the content manager 312 to the active directory 104 for entry to the server database 228. Periodically, changes to the local content catalog 316 are sent to the server database 228 to keep the directory information as current as possible. Updates could happen on a regular interval such as every two minutes and/or whenever a change in the local content catalog is made.

The content manager 312 also knows the location of all portions of content objects associated with that content manager 312. Upon attaching to the system 100, the content manager 312 contacts each of the content exchanges 116 for status. The content exchange 116 periodically reports on its content object or content object portions to the associated content managers 312. Armed with this information, the content manager 312 can direct a client computer 112 to a content exchange 116 that may have some or all of the desired content object available for download.

Location information for content objects that is reported by all the content exchanges 108 is maintained by the content manager in the content location database 320. By querying the content location database 320, the content manager 312 can determine the content exchanges 116 that contain a content object or a portion of a content object. During the routing of the client computer 112 to a content source, the presence of the content object in a particular content exchange 112 can affect the routing determination.

The content exchange information store 324 holds information on all active content exchanges 116. Upon power-up of the origin server 108, the content exchange database 232 in the active directory 104 is downloaded into the content exchange information store 324. All the content exchanges 116 listed in the content exchange information store 324 are queried after power-up for status information that is retained as content exchange information 324. The status information includes the number of concurrent links used, total number of concurrent links allowed, bandwidth utilization, and cache churn rate. The churn rate of the cache is the amount of time unused data remains in the cache and is indicative of the loading of the cache. For example, data is usually flushed out of the cache quickly for content exchanges 116 that are busy relative to the amount of storage in the cache. However, some embodiments that could have sticky content objects that remains pinned in the content exchange 116 for a period of time regardless of use.

The content manager 312 intelligently redirects the client computer 112 wanting a content object to the preferred source for that object. Preference information provided from the client computer 112 is used to determine the sources of the content object preferred by the client computer 112. This information is used along with the current locations of the content object and the loading of the possible content exchanges in order to direct the client computer 112 to the preferred content exchange 116 for download of the content object.

In some embodiments, the content manager 312 can regulate access to content objects. When a client computer 112 attempts to download a content object associated with a content manager 312, a login dialog can be presented if the administrator has secured the content object. The user may enter a user name and/or password in the login dialog to enable redirection of the client computer 112 to a source for the content object. This user name and/or password is in addition to any required for the active directory 104. Before redirecting the client computer 112 to that source, the user name and/or password or login information is checked against a list of acceptable login information previously stored on the origin server 108. Access to a whole origin server 108 or a volume, a directory or a content object on the origin server 108 may be regulated in this manner.

Some embodiments, allow the origin server 108 or active directory 104 to preload content objects on a content exchange 116. The requests for content objects are monitored to determine desirability. Desirability information, billing information and/or other considerations are used to determine which content objects to preload on a content exchange 116. Either the origin server 108 or active directory 104 can request the content objects from a content exchange 116 to preload them there. Periodically, the content objects could be requested to keep them loaded on the content exchange such that they are not unloaded because of inactivity.

The health check 330 can be either a hardware or software application which provides operational characteristics of an associated origin server 108. In an embodiment, the health check 330 provides a single indication of origin server 108 status. The single indication is a normalized value between zero and one indicating a combination of origin server characteristics. For example, it could include a CPU load, a CPU temperature, a number of concurrent connections, and/or a number of requests an origin server is facilitating. In an alternate embodiment, the health check 330 could monitor characteristics of a content exchange 116 while running on another content exchange 116 or origin server 108.

Figure 3B:
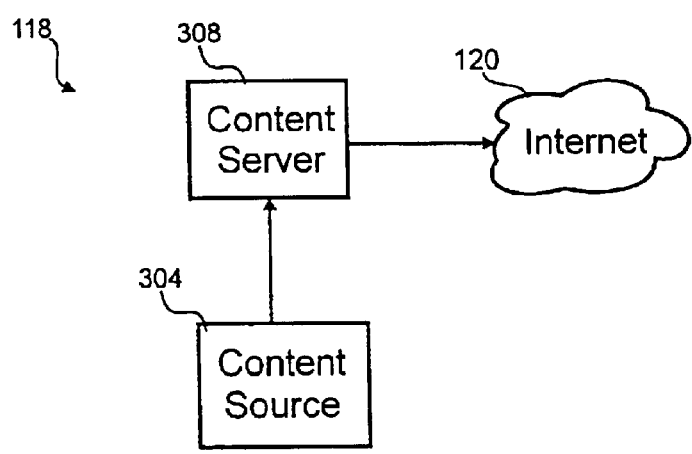
FIG. 3B is a block diagram of an embodiment of an external origin server portion of the content distribution system.

Referring next to FIG. 3B, a block diagram of an embodiment of an external origin server portion 118 of the content distribution system 100 is shown. The external origin server 118 differs from the origin server 108 in that the external origin server 118 does not have content manager software installed upon it. Included in the external origin server 118 are a content server 308 and a content source 304.

The administrator of the external origin server 118 determines one or more client computers 112 authorized for receiving content objects through a content exchange 116. The routing database 234 is updated by the administrator to allow individual client computers 112 to access the content objects through a content exchange 116. A web page on the active directory provides an interface to entering information on client computers 112 into the routing database 234. Other embodiments could automate the interface between the external origin server 118 and the routing database 234.

The updates to the routing database 234 are downloaded and stored locally by client computer 112. Subsequent attempts to access the external origin server 118 are redirected to a content exchange 116 to service that request. Redirection in this way allows an external origin server 118 to redirect client computers 112 to a content exchange 116 without assistance from content manager software.

An external origin server 118 may have one or more content exchanges 116 assigned to carry content objects for the external origin server 118. The routing database 234 could redirect subscribing client computers to one or more of these content exchanges 116. If the client computer were allowed to use two or more of these content exchanges 116, a client-side routing analysis would be performed on the two or more content exchanges to allow ranking of the relative QOS between them.

The content objects of an external origin server 118 can be preloaded to a content exchange(s) allocated to provide those content objects. To decrease latency when a content object is requested for the first time, the active directory 104 can crawl the external origin server 118 to determine the content objects available from that server 118. The available content objects may be added to the crawling directory 124. Once the available content objects are known, the active directory 104 requests each content object from the associated content exchange(s) in order to cause loading of each content object on the associated content exchange(s). In this way, content objects are preloaded on the associated content exchanges.

Figure 4A:
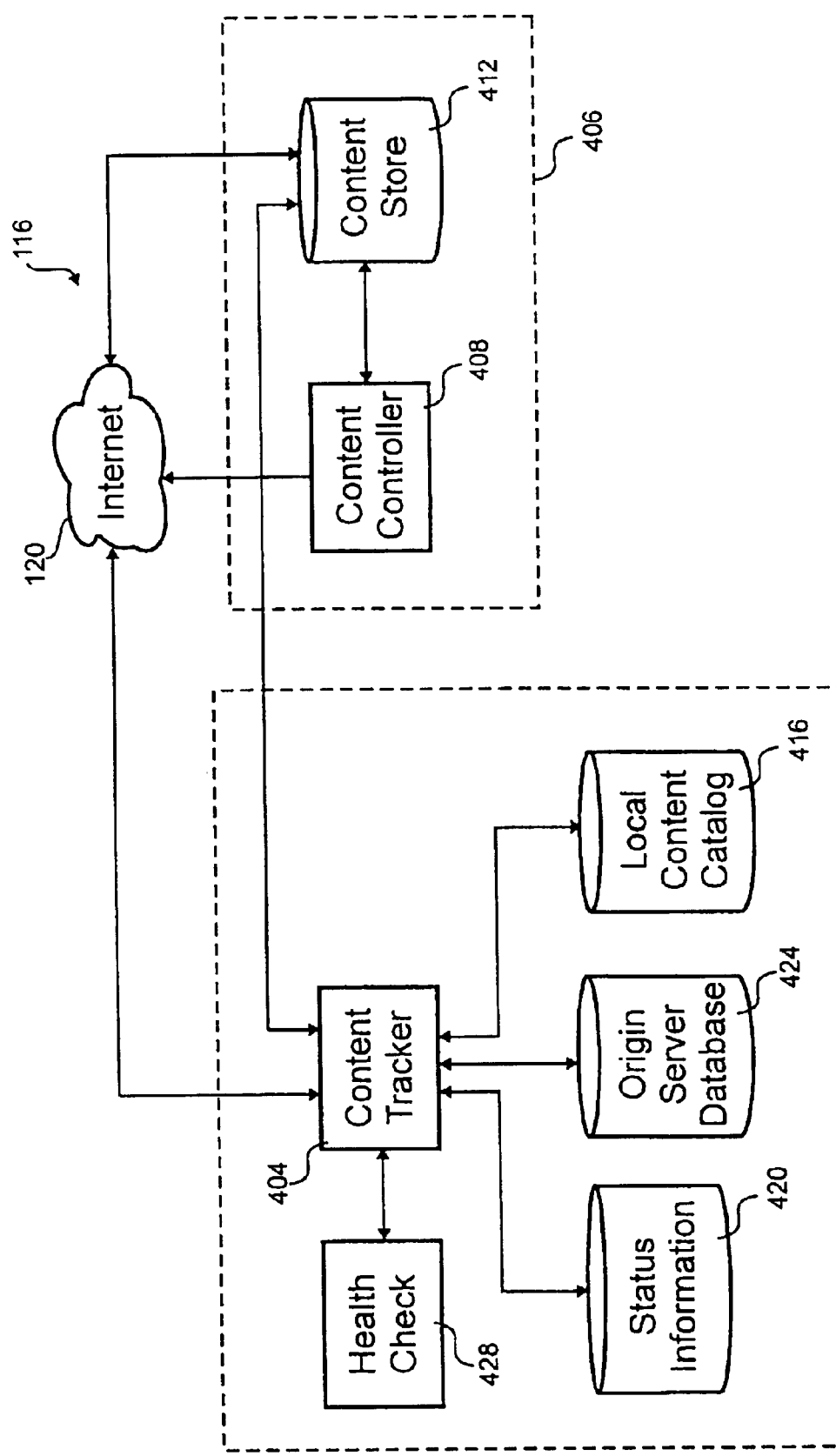
FIG. 4A is a block diagram of an embodiment of a content exchange portion of the content distribution system.

With reference to FIG. 4A, a block diagram of an embodiment of a content exchange portion 116 of the content distribution system 100 is shown. The content exchange 116 caches content objects requested by client computers 112 under the control of the content manager 312. Included in the content exchange 116 are a tracking system 402, and a content node 406. The tracking system includes a content tracker 404, a health check 428, status information 420, a local content catalog 416, and an origin server database 424 while the content node 406 includes a content controller 408 and a content store 412.

The health check 428 can be either a hardware or software application which provides operational characteristics of an associated content exchange 116. In an embodiment, the health check 428 provides a single indication of content exchange 116 status. The single indication may be a normalized value between zero and one indicating a combination of content exchange characteristics including, for example, a CPU load, a CPU temperature, a number of concurrent connections, and a number of requests a content exchange is facilitating. In an alternate embodiment, the health check 428 could monitor characteristics of a content exchange 116 while running on another content exchange 116, origin server 108 or location.

The content store 412 holds the content objects available for download to the client computers 112 from that content exchange 116. The name of the origin server 108 providing the content object along with path information and the filename is stored with the content object in the content store 412. Via the Internet 120, the client computers 112 connect to the content store 412 and download the content object file or data stream. As new content objects are added to the content store 412, old content objects are removed. The age of a content object relates to the last time a content object was accessed. Some content objects on the store 412 never age such that they stay in the store 412 for a predetermined time. An origin server 108 could arrange for the content exchange 112 to store a content object for a predetermined period of time.

When the client computer 112 requests a content object from the content store 412, the content object may not be currently loaded in the content store 412. The content store 412 notifies the content controller 408 of the unfulfilled request for the content object. The content controller 408 locates missing content objects or portions thereof in other content exchanges 116 or from the content server 308 that originated the content object. The missing content objects are loaded into the content store 412 by the content controller 408 such that the client computer 112 can download this information.

When a content object is missing from content store 412, the content controller 408 first checks with other content exchanges 116 to determine if the object is available. If no content exchange 116 has the desired content object, the content server 308 that originated the information is queried for the content object. The content store 412 does not include the IP address for the originating content server 308 so the dynamic DNS 204 is queried for that information. Given the origin server name, the dynamic DNS 204 provides the IP address such that the content controller 408 can request the content object from the proper content server 308.

The content tracker 404 reports to the system 100 the current items in the content store 412 and status information for the content exchange 116. The local content catalog 416 records the origin server name, path and filename for each content object or portion of a content object in the content store 412. As new items are added to and old items are removed from the content store 412, the local content catalog 416 is updated. When a content manager 312 connects to the system 100, a query is made to all content trackers 404 to determine what portions of content objects are stored on the content stores 412. The initial query provides a baseline to which the content tracker 404 updates as changes are made to the content store 412. The changes are sent directly to each of the content managers 312 that has content stored in the content store 412. The dynamic DNS 204 is used during this process to determine the IP address corresponding to the origin server name for each content object.

The content tracker 404 also provides status information for the content exchange 116 to the content mangers 312. The status information is sent periodically to each of the content managers 312 as a broadcast or multicast, for example, every five minutes and/or when changes occur. The status information could include the number of concurrent links to the content exchange currently in use, the total number of concurrent links allowed, the bandwidth utilization, and the cache churn rate. In other embodiments, the status information is posted to a central location that the content manager 312 can query when determining where to send a client computer 112 for a downloading a content object.

The content tracker 404 maintains the origin server database 424 to track the origin servers 108 active in the system 100. After attaching to the system, all origin servers 108 identify themselves to the content trackers 404. The content trackers 404 record the origin server name and IP address in the origin server database 424. A query to the dynamic DNS provides the IP address for a given origin server name. If an origin server 108 notifies the content tracker 404 of impending unavailability or if the content tracker 404 cannot contact a particular origin server, the entry for that origin server is removed from the origin server database 424. Additionally, the content corresponding to that origin server 108 may be purged from the content store 412 and the local content catalog 416 is updated. In some embodiments, the content object and content object portions are not purged, but are simply tagged for deletion as the storage space is needed.

In some embodiments, the content controller 408 can be instructed by the system 100 to acquire and retain predetermined content objects in the content store 412. Content objects that are anticipated to be wanted can be preloaded in preparation for the demand. The desirability of a content object can be determined by monitoring click-throughs to those content objects from the search and directory pages 212, 216. For example, content objects related to a famous person could be loaded onto content stores 412 immediately before a biography program on the famous person is aired on network television. Alternatively, users could subscribe to a service that loads content objects to some content exchanges 116. For example, a scheduled network program could be loaded to coincide with a TV broadcast the user could view over the Internet 120 in lieu of the TV broadcast. The content would be available without delay to the subscribed users.

Figure 4B:
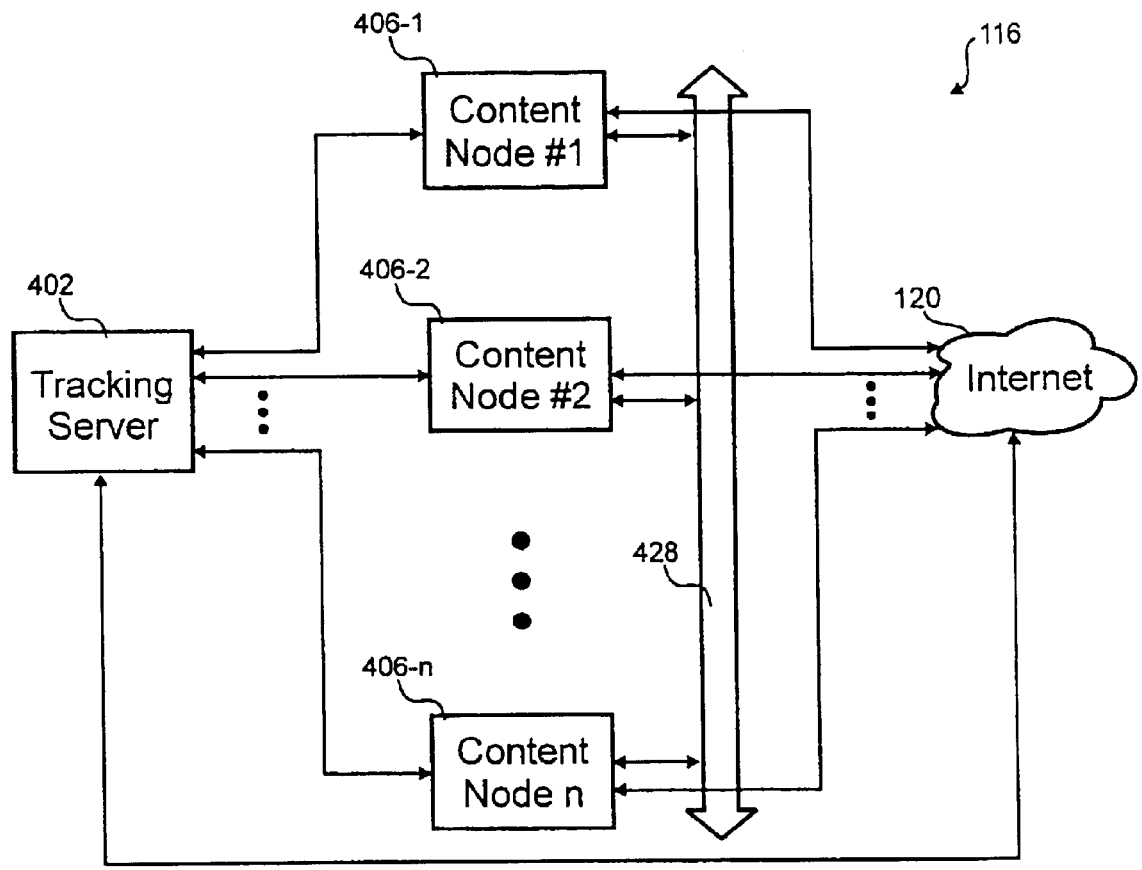
FIG. 4B is a block diagram of another embodiment of a content exchange portion of the content distribution system.

With reference to FIG. 4B, a block diagram of another embodiment of a content exchange portion 116 of the content distribution system 100 is shown. This embodiment includes multiple content nodes 406 coupled to a single tracking server 402. A content bus 428 allows content nodes 406 to check each others content stores 412 for missing content objects. The content bus 428 could also couple to other content notes in other locations. The content bus 428 may or may not travel in part over the Internet 120.

Figure 4C:
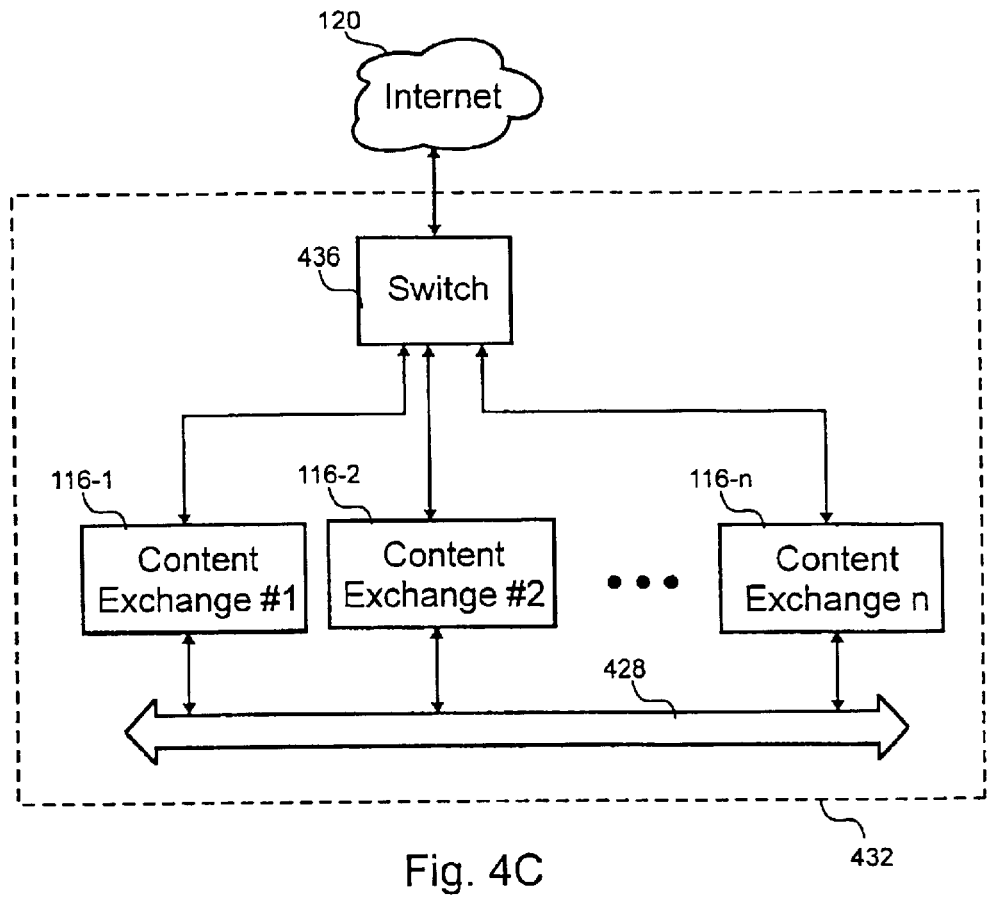
FIG. 4C is a block diagram of an embodiment of a content exchange site including multiple content exchange servers.

Referring next to FIG. 4C, a block diagram of an embodiment of a content exchange site 432 including multiple content exchange servers 116 is shown. Even though the content exchange site 432 includes multiple content exchange servers 116, it appears to the system a single content exchange 116. The load of the content exchange site 432 is distributed among the content exchange servers 116. A switch 436, such as a layer four switch, distributes the content object requests to the content exchanges 116 and aggregates the spooled responses to the Internet 120.

Figure 5:
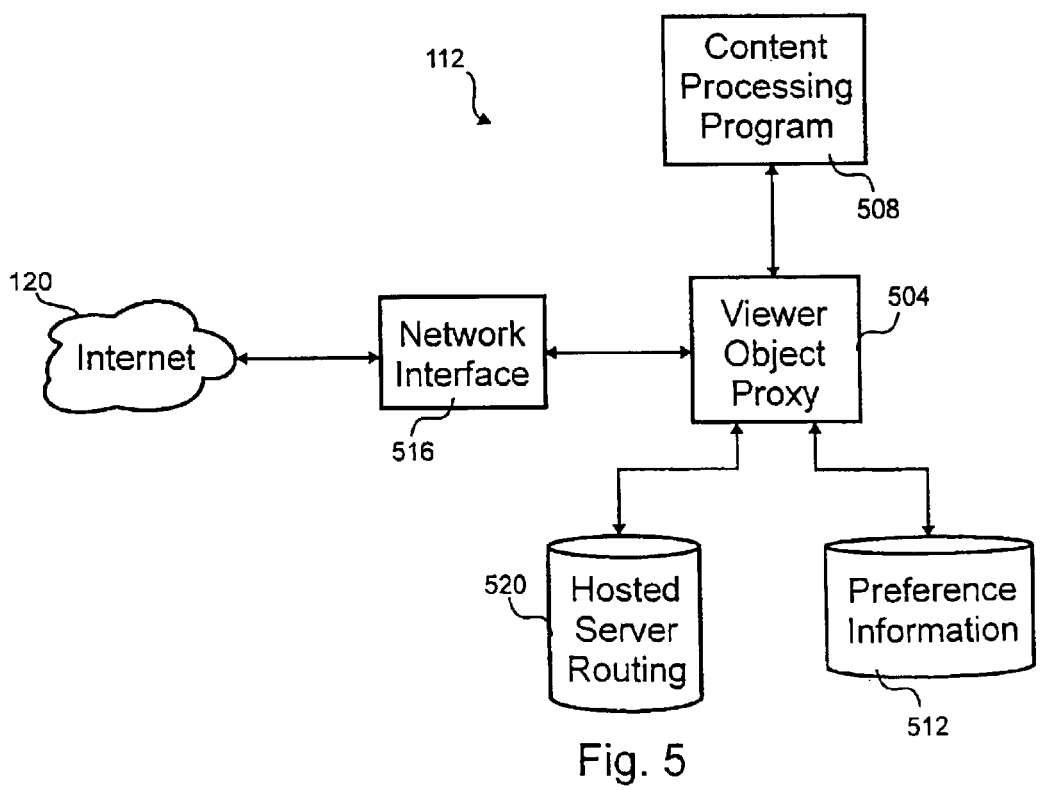
FIG. 5 is a block diagram of an embodiment of a client computer portion of the content distribution system.

Referring next to FIG. 5, a block diagram of an embodiment of a client computer portion 112 of the content distribution system 100 is shown. The client computer 112 communicates to the Internet 120 in order to deliver content to a user. Included in the client computer 112 are a viewer object proxy 504, a content processing program 508, preference information 512, a network interface 516, and hosted server routing 520.

The content processing program 508 is typically software that interprets or processes a content object downloaded from the Internet 120. Examples of content processing programs 508 include web browsers, file transfer protocol (FTP) software, gopher software, news (NNTP), mail programs, streaming media players, non-streaming media players, and other software. The Internet communication from content processing program 508 that is normally sent directly to the Internet is redirected to the viewer object proxy 504.

The viewer object proxy 504 serves as intermediary between the Internet 120 and the content processing program 508. After installation of the viewer object proxy 504, it determines its general location relative to known points on the Internet 120. Content exchanges 116 that are reasonable candidates for providing sufficient QOS are tested to determine the number of hops necessary and the latencies between each content exchange 116 and the viewer object proxy 504. A weighting of QOS factors, such as the number of hops and bandwidth achieved, is recorded as preference information 512 and is passed as meta-data to the content manager 312 in an HTTP header.

Other embodiments could pass meta-data in any sort of data channel and not just through a HTTP header. For example, the meta-data could travel through a dedicated port, an IP address, a URL, a header, or other logical channel.

The preference information 512 is the result of network analysis performed from the client computer perspective 112. When a content object is requested, the preference information 512 is communicated to the content object manager 312 which in turn selects an appropriate content exchange 116 for the client computer 112. Periodically, such as every hour, the preference information 512 is updated using automated tests or is updated manually by the user. Subsequent tests take into account the previous results to efficiently consider preferred content exchanges. For example, the first analysis may check one hundred content exchanges, but a subsequent analysis could eliminate the poor performing content exchanges such that only fifty are analyzed.

The preference information 512 includes a list of content exchanges 116 and their associated QOS values resulting from client-side network analysis. In some embodiments, there are multiple pathways to an external origin server 118. The multiple pathways are separated by port, IP address, server identification (ID), and/or other mechanisms. Client-side network analysis could be used to determine a QOS value associated with each pathway to an external origin server 118 or any source of a content object with multiple pathways.

After the user of the client computer 112 chooses a content object, the origin server name is provided to the viewer object proxy 504. The origin server name is used for the viewer object proxy 504 to query the dynamic DNS 204 for the IP address of the origin server 108. Once the IP address is known, the content processing program 508 is redirected to the content manager 312 for the desired content object. The content manager 312 is passed the preference information 512 to allow routing to the appropriate content exchange 116. In this embodiment, the preference information 512 includes the preferred ten content exchanges, but could be adjusted by the user.

In some embodiments, the viewer object proxy 504 can be HTTP-specific but protocol independent for routing information. Thus, routing information is transferred according to HTTP, but the actual routing information is protocol independent. However, one skilled in the art would recognize that the viewer object proxy 504 can also be configured to work with other network protocols as needed. For example, the viewer object proxy 504 can also be configured to operate in accordance with FTP, NNTP, RTP, RTSP, SMTP, or SHOUT etc.

The client computer 112 includes a host server routing 520 database. This host server routing 520 can include information related to external origin servers 118 accessible by the client computer 112. In an embodiment, host server routing 520 is a portion of the routing database 234 included in the active directory 104.

The client computer 112 includes a network interface 516 that connects the viewer object proxy 504 to the Internet 120. Common examples of network interfaces 516 include analog modems, DSL modems, ISDN, cable modems, satellite modems, cellular modems, etc.

In this embodiment, the client computer is associated with a home user. In other embodiments, the client computer could serve digital movies to a theater or provide content objects to a corporate network user, a hotel patron or apartment complex.

Figure 6:
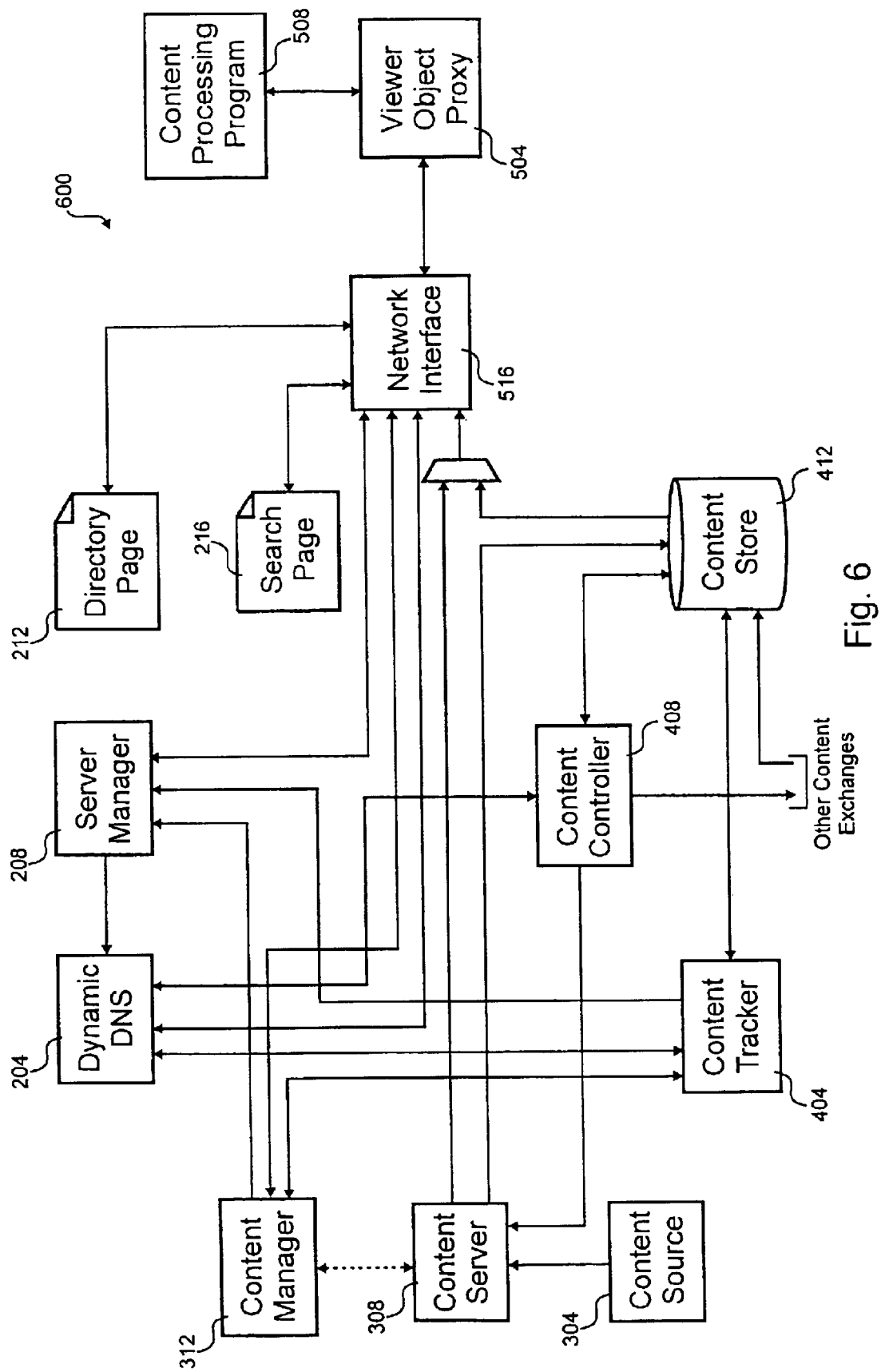
FIG. 6 is a block diagram of an embodiment of a content distribution system.

With reference to FIG. 6, a block diagram of an embodiment of a content distribution system 600 is shown. This figure depicts data flow between data blocks without showing transport over the Internet 120. It is to be understood, however, that the Internet 120 is used in some embodiments. Also, the figure is somewhat simplified in that some blocks from FIGS. 2–5 and the external origin server(s) 118 and crawling directory 124 are not included to simplify the FIG. 6.

The network interface 516 is the connection to the Internet 120 for the client computer 112. The client computer 112 connects to the directory and search pages 212, 216 to allow the user to select content objects for download. When a content object is selected, redirection of the client computer 112 from the active directory 104 to the appropriate origin server 108 uses the dynamic DNS 204. Preference information 512 is passed to the content manager 312 to assist its selection of the source for the content object. Depending on the selection made by the content manager 312, the content object is downloaded from one of the content exchanges 116 or from the content server 308.

The active directory 104 interacts with the other modules in the system 600. The client computer 112 accesses the directory and search pages 212, 216 to select a content object. The content tracker 404 and content manager 312 respectively provide status and catalog information to the server manager 208. Account information is provided to the server manager 208 by the administrator of the origin server 108 and by the user of client computer 112 to maintain the subscriber database 224. Redirection from the origin server name to the IP address of the origin server 108 is provided to the viewer object proxy 504, the content tracker 404 and the content controller 408 by the dynamic DNS 204.

The origin server 108 communicates with the server manager 208, the client computer 112, the content tracker 404, the content store 412, and the content controller 408. The local content catalog 316 is provided to the server manager 208 from the content manager 312 in order to maintain the server database 228 with current content information. Preference information 512 is provided to the content manager 312 from the client computer 112 to facilitate selection of a source of the content object. The content tracker 404 interacts with the content manager 312 to know what content objects are stored on the content exchange 116. Content objects are read from the content server 308 by either the content store 412 or the client computer 112.

The content exchanges 116 interact with the other modules in the system 600 as well. Status information is provided to the active directory 104 and/or the content manager 312. The dynamic DNS is used by both the content controller 408 and the content tracker 404 to find the IP address of an origin server 108 that contains a content object. A selected content exchange may contact other content exchanges when an object is needed for the content store 412. If the other content exchanges do not have the content object, the content controller 408 requests the object from the content server 308 for delivery to the selected content store 412.

Figure 7A:
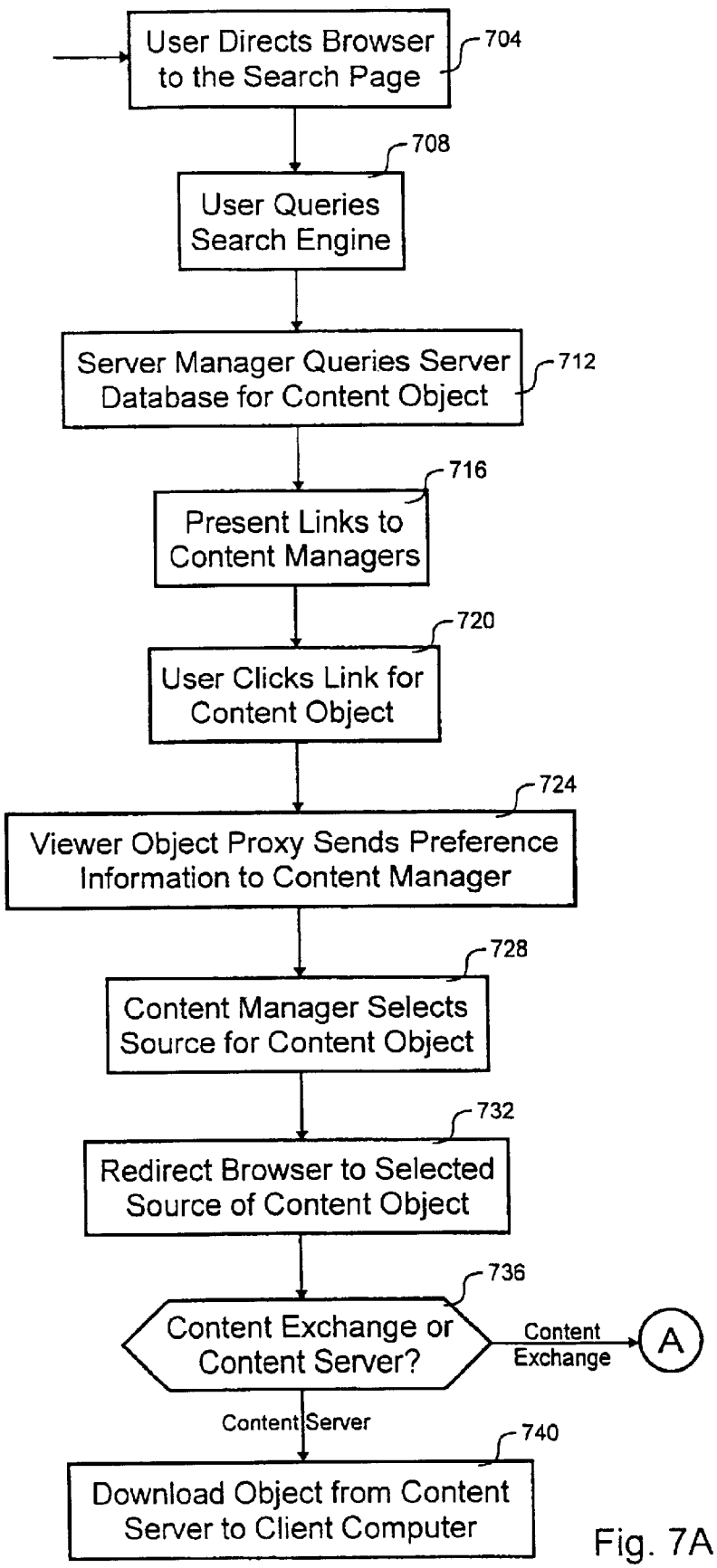
FIG. 7A is a first portion of a flow diagram of an embodiment of a process for distributing content to a user.
Figure 7B:
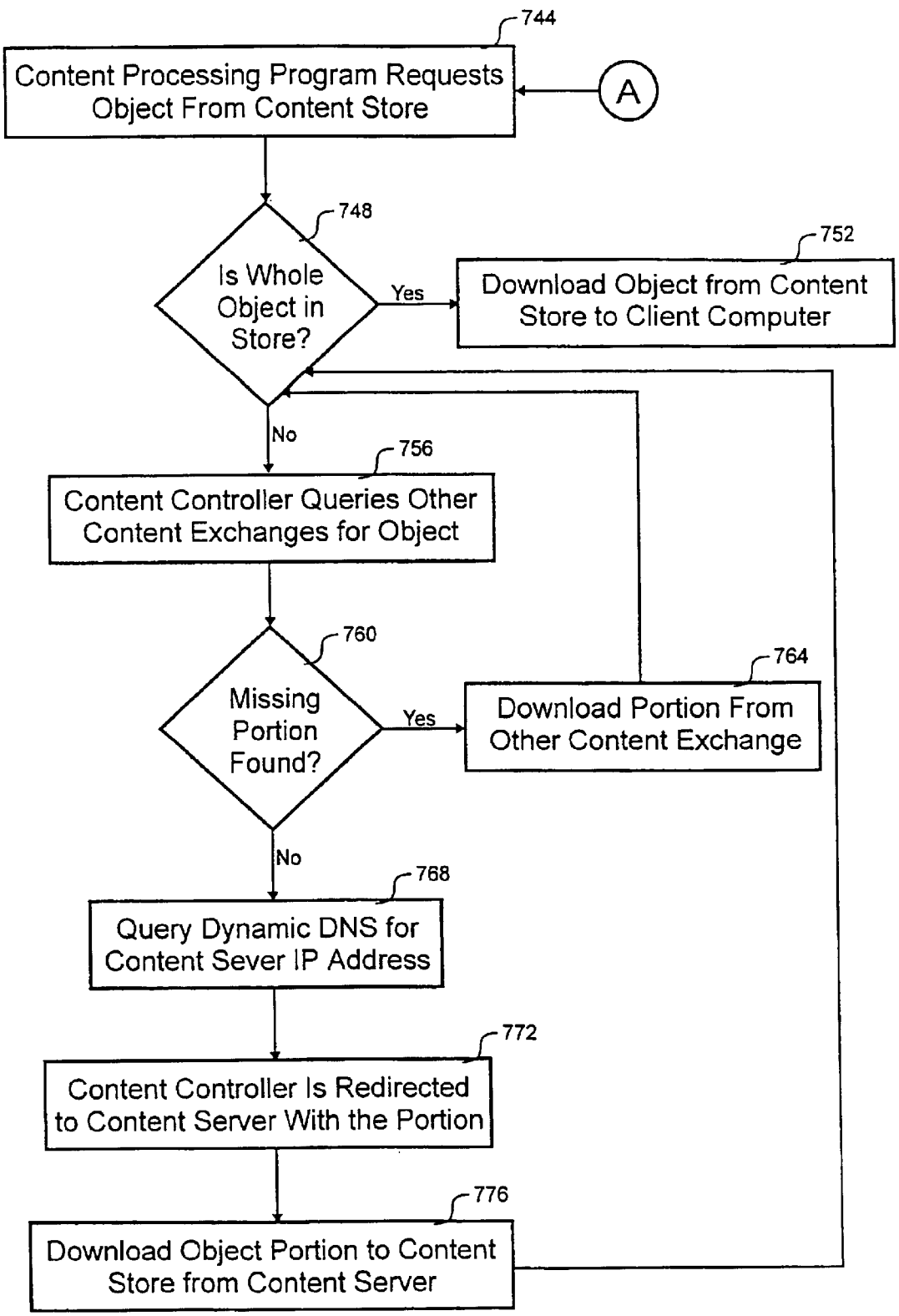
FIG. 7B is a second portion of the flow diagram of FIG. 7A.

Referring next to FIGS. 7A–B a flow diagram of an embodiment of a process for distributing content to a user is shown. Before the depicted process, the user and administrator respectively download and install software for the client computer 112 and origin server 108. The administrator chooses content on the content server for publishing to the system 600. To determine the preference information 512, the viewer object proxy 504 automatically interrogates nearby content exchanges 116 for adequate QOS.

The depicted process begins in step 704 where the user directs a web browsing content processing program 508 to the directory or search page 212, 216 of the active directory 104. In this embodiment, the user queries a search engine on the search page 216 using a boolean query in step 708 to find a content object. The search engine would search the server database 228 for hits and may also search a crawling directory 124 in step 712. Alternatively, the user could navigate the directory page 212 to find a desired content object.

The search or directory page 212, 216 presents links for each of the content objects that the user might select in step 716. Each link includes the origin server name 108, port, path and name for the content object. Given the choices available, the user may select one of the links corresponding to the desired content object in step 720. The dynamic DNS 204 is queried by the viewer object proxy 504 to determine the IP address of the origin server name from the link. Once the IP address is known, the content processing program is redirected to the IP address retrieved from the dynamic DNS 204 and the path and filename from the link.

Once the client computer 112 is connected to the content manager 312, the preference information 512 is forwarded to the content manager 312 in step 724. The content manager 312 analyzes the content location database 320, the preference information 512 and the status information to determine the source of the content object to redirect the client computer 112 to in steps 728 and 732.

A determination is made in step 736 as to whether the source is a content exchange 116 or the content server 308. The content server 308 may be chosen if the content manger 312 determines it can provide adequate QOS or superior QOS. In some embodiments, the content server 308 is only considered as a source if there are no content exchanges 116 that can provide adequate QOS. If the content server 308 is chosen, the origin server 108 provides the content object to the client computer 112 in step 740.

If the content manager 312 selects a content exchange 116 to host the content object request, the content processing program 508 is redirected to the chosen content store 412 and processing continues in step 744 of FIG. 7B. The content processing program 508 requests the content object in the link from the content store 412 in step 744. If the whole content object is in the content store 412, the object is downloaded from that content store 412 to the client computer in steps 748 and 752.

Alternatively, a whole copy of the content object is assembled in the content store 412 if any portion of the content object is missing. The building of the whole content object happens transparently to the user. In steps 756 and 760, the content controller 408 queries the other content exchanges 116 to determine which have the missing portion of the content object. The content object is reassembled in the content store 412 from beginning to end such that the beginning is available as soon as possible for download by the client computer 112.

In an iterative manner, the missing portions are retrieved from each content exchange 116 in step 764 until the whole content object is in the content store 412. If no other content exchange 116 has the missing portion of the content object, a query is made to the origin server 108 for the missing portion, in step 768. The dynamic DNS 204 is queried to determine the IP address of the origin server name for the content object. The content controller 408 is directed to the origin server 108 with the content object in step 772 by the dynamic DNS 204. The missing portion is downloaded from the content server 308 of that origin server 108 in step 776. Processing loops back to step 748 to retrieve any other missing portions.

This process of searching for portions continues in an interative manner until all missing portions are copied to the content store 412. Although this embodiment sequentially retrieves the missing portions, other embodiments could determine the location of the missing portions and retrieve them in parallel, in any order or in the order found.

Addressing System

One embodiment of the present invention provides a multiple address system which one can utilize to provide additional information about an object in conjunction with the address indicating the location of the object. One such possibility of the additional information is an alternative location for the object indicated by the original address. Thus, the coupling of information about the object with an original address provides a descriptive aspect to the addressing of the object.

Figure 8:
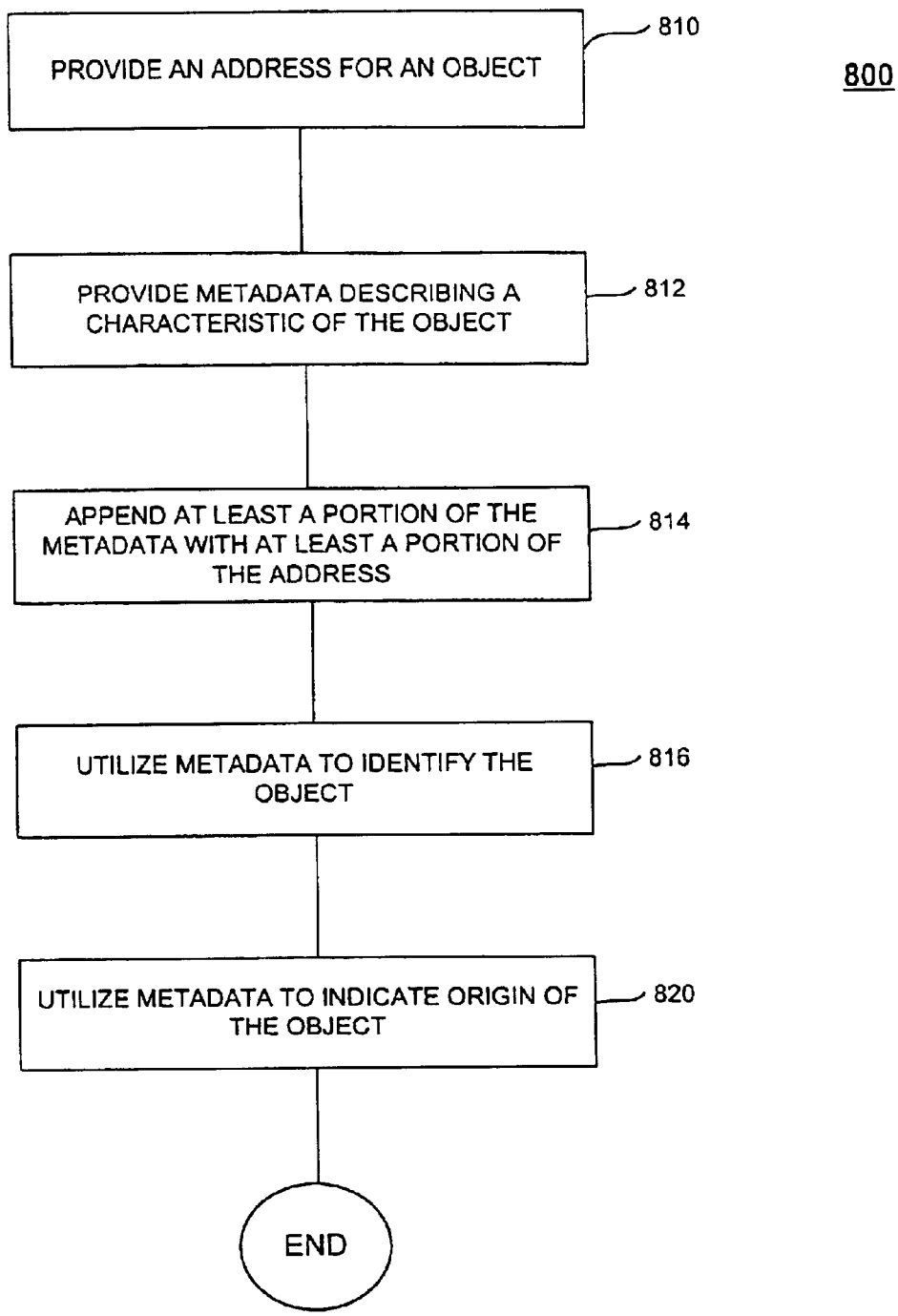
FIG. 8 is a flow chart demonstrating a method for implementing an embodiment of the invention.

Referring now to FIG. 8, one such method for implementing an embodiment of the invention can be seen. In method 800, a first address is provided for an object 810. In addition to providing the first address, metadata describing a characteristic of the object is provided 812. Metadata is intended to mean information, other than the first address for the object, that describes a characteristic of the object being addressed with that address. Metadata could thus mean an alternative location or address for the object being addressed with the first address. In addition, such an alternative address could be the original address or origin from where the object originated. In addition, metadata may also mean information that describes other characteristics about the object being addressed. Furthermore, such metadata is not necessarily intended to be limited to a single characteristic, but rather, could include a plurality of different characteristics. In 814, at least a portion of the metadata is appended to at least a portion of the original address. In accomplishing this, metadata identifying the object can be utilized 816. Furthermore, that metadata can indicate the origin of the object 820, as described earlier.

Figure 9:
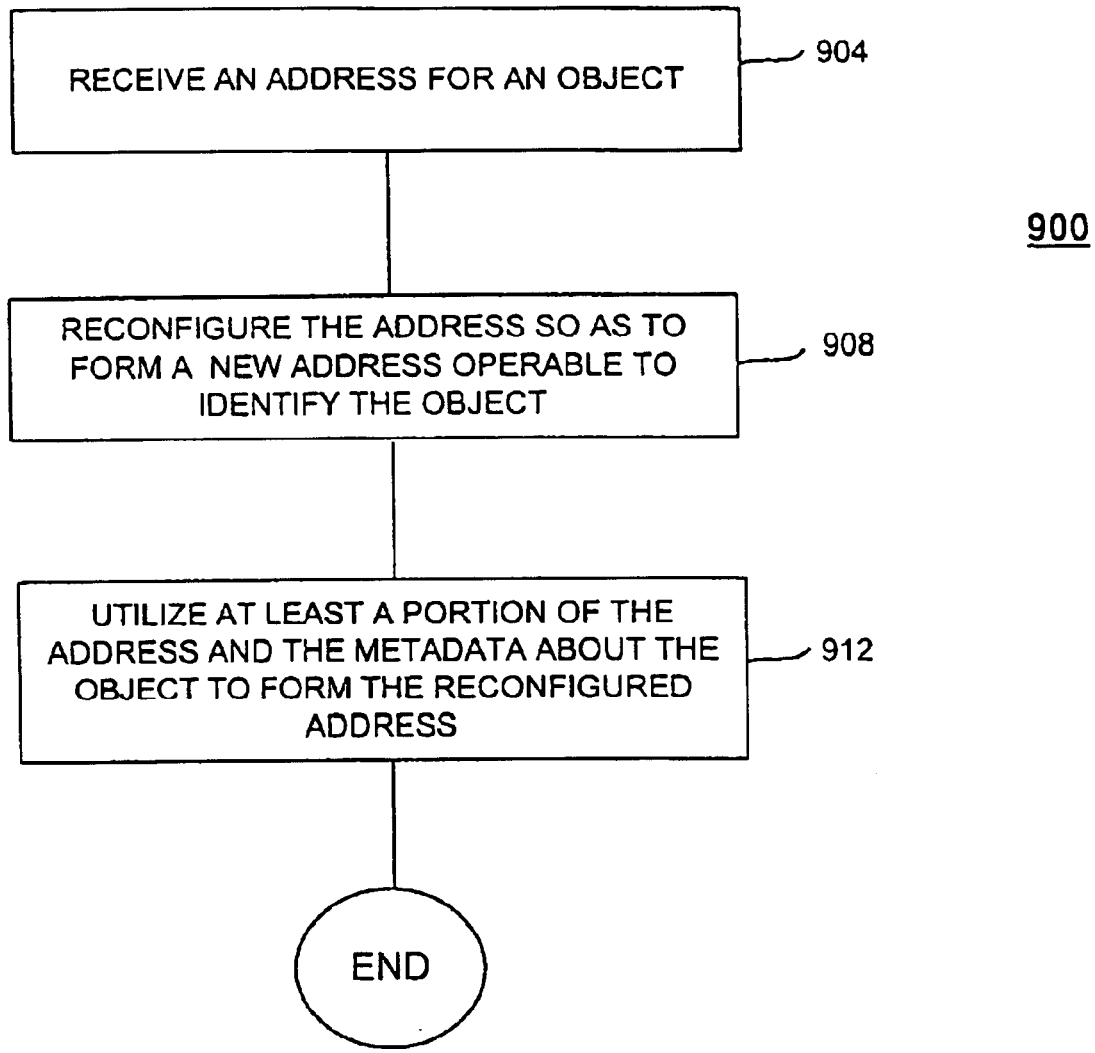
FIG. 9 is a flow chart illustrating a method for implementing another embodiment of the invention.

Another embodiment of the invention is shown in FIG. 9. In method 900 an address is received for an object 904. The address is reconfigured so as to form a new address which is operable to identify the object 908. In reconfiguring the address at least a portion of the original address is utilized and the metadata about the object is also utilized to form the reconfigured address. The metadata can be indicative of the origin of the object. Alternatively the metadata can be indicative of an alternative source of the information content of the object. Furthermore, the metadata can contain alternative information regarding the object.

Figure 10:
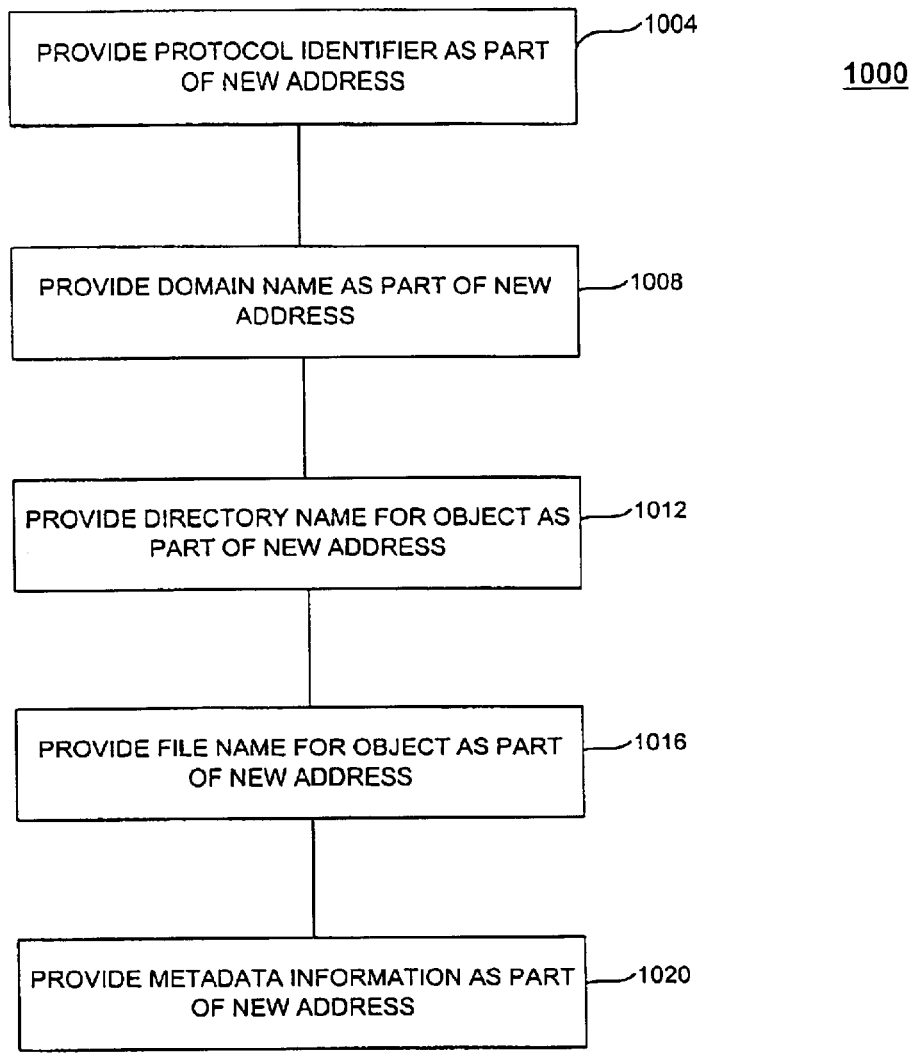
FIG. 10 is a flow chart illustrating a method for implementing a format for an embodiment of the invention.

In FIGS. 8 and 9, the formatting of the new address can be accomplished in a variety of ways. FIG. 10 illustrates one example of how such a new address could be configured. In FIG. 10, method 1000 illustrates such a format. In 1004 a protocol identifier is provided for use as part of the new address. In the embodiment described earlier the protocol could take the form of RTSP which stands for Real Time Streaming Transport Protocol, a standard for streaming real time multimedia over IP in packets. Alternative protocols would also be readily understood by those of ordinary skill in the art, such as HTTP which stands for Hypertext Transfer Protocol, the transport protocol for transmitting hypertext documents around the Internet. Again, alternative protocols could be implemented, as well, either for those protocols in existence or those that arise in the future. A domain name may also be provided as part of the new address 1008. For example, such a domain name could be one of those currently used as the generic top level domain names (TLD) currently implemented on the Internet. Furthermore, a directory name could be provided for the object as part of the new address 1012. The directory name could be the directory in the server which serves the domain name mentioned above. In addition, a file name for the object could be provided as part of the new address 1016. Finally, the metadata information could be incorporated with the earlier elements of the address into a single address. Thus, by arranging the various elements of the address into a predetermined format, the metadata could be ignored when the address was being implemented as a standard uniform resource locator (URL) address; yet, utilized when the new address was being implemented as a dynamic address.

Figure 11:
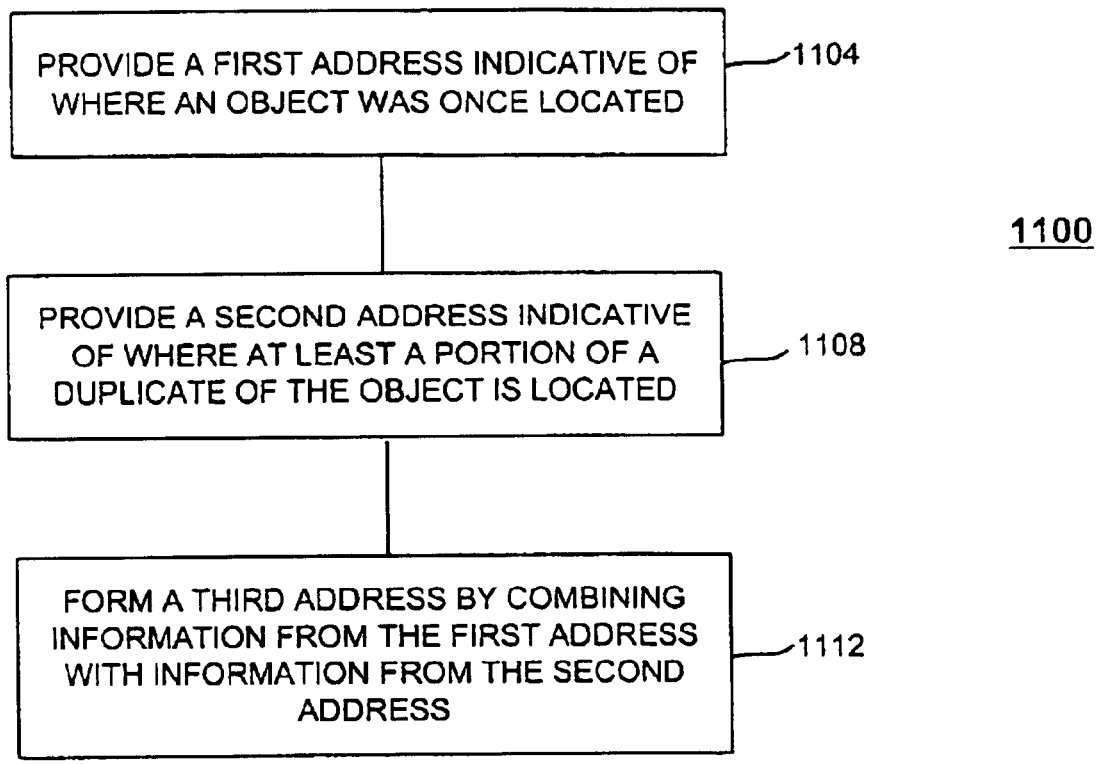
FIG. 11 is a flow chart illustrating a method for implementing an embodiment of the invention.

In FIG. 11, a method 1100 illustrates yet another embodiment of the invention. In FIG. 11, a first address is provided which is indicative of where an object was once located 1104. Thus, the object may still be located at this first address or the object may no longer reside at that address. This is often the case in the Internet where after a lengthy time period an object is removed from a server as it is no longer of interest to most users. Thus, often users receive error messages indicating that an object can not be located or an object that was addressed could not be located. A second address is provided which is indicative of where at least a portion of the duplicate of the object is located 1108. Thus, this second address can indicate the origin from where the object originated. Alternatively, this second address can indicate an alternative location where the object or a portion of the object information is stored. A third address is formed by combining the information from the first address with the information from the second address 1112. The third address is formatted such that it indicates not only the first address where an object was once located but also the second address where at least a portion of a duplicate of the object is located. The third address can be utilized to attempt to retrieve the object from the first address. In addition, the third address can be utilized to attempt to retrieve the object information from the second address. Thus, one might attempt to retrieve the object from the first address and fail given the fact that the object has been removed from that first address. Then, a second attempt can be made by utilizing the third address to go to the location indicated by the second address in attempting to locate the object. It might be the case that the object information is distributed at more than one location, in which case, the object or only a portion of the object's information could be recalled from the second address.

Figure 12A:
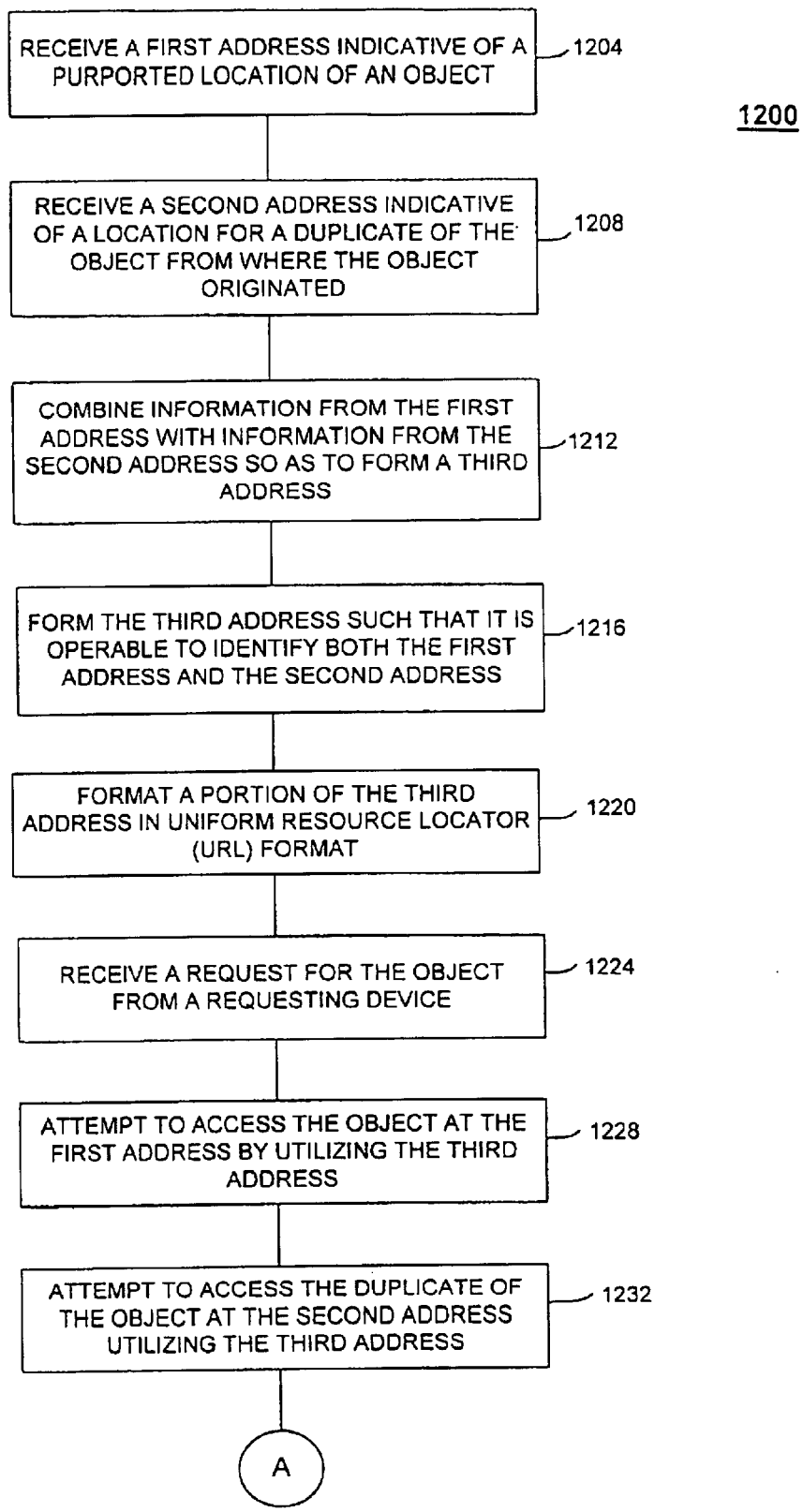
FIGS. 12a and 12b are a flow chart illustrating a method for implementing an embodiment of the invention.
Figure 12B:
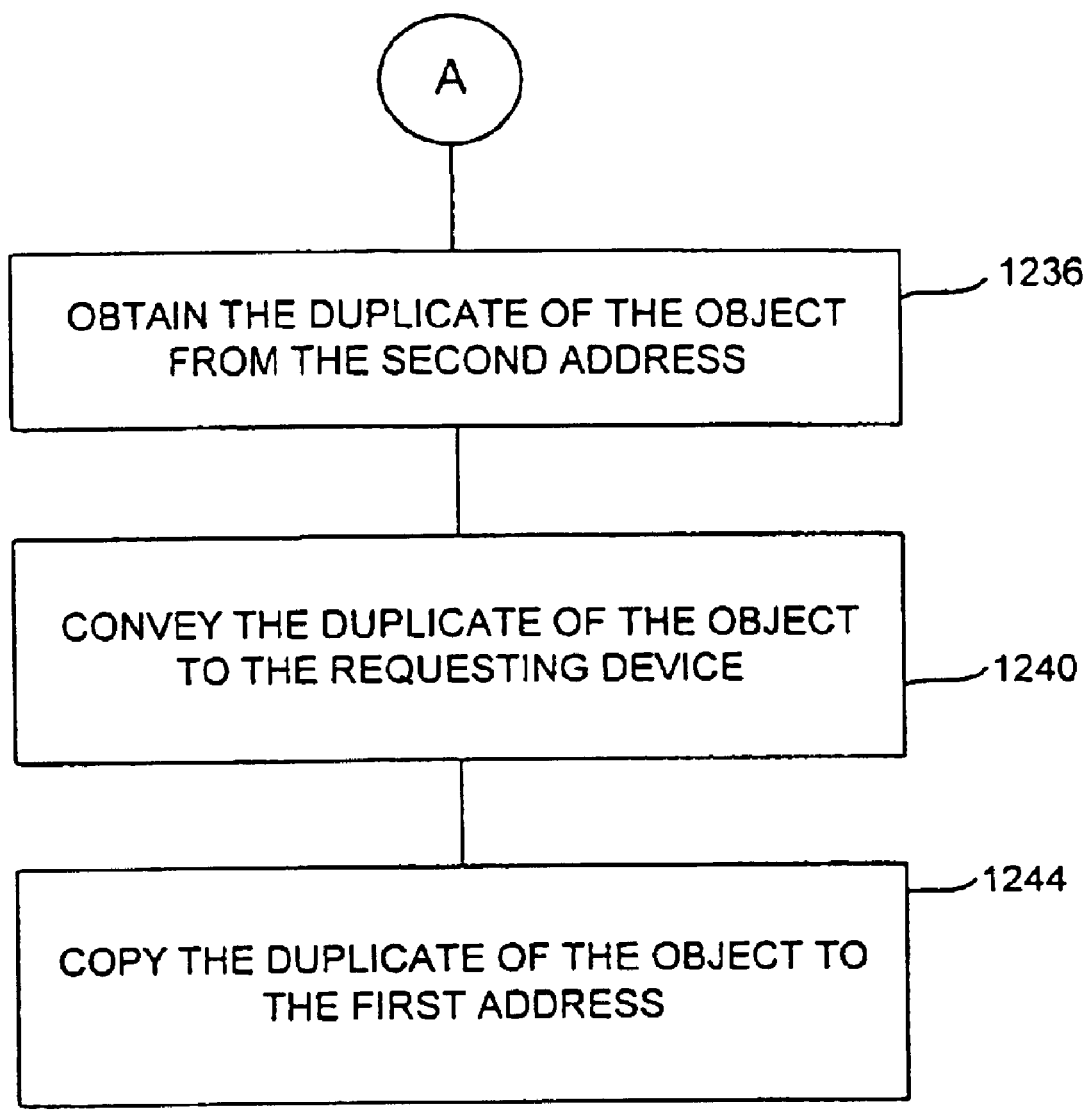

In FIGS. 12A and 12B, a flowchart demonstrating another embodiment of the invention is illustrated as method 1200. In method 1200, a first address is received which is indicative of a purported location for an object 1204. A second address is received which is indicative of a location for a duplicate of the object from where the object originated. By referring to a duplicate or copy of an object, it is intended that the object and the duplicate contain the same information. It could be that the object was actually copied from the duplicate. Thus, the duplicate is capable of being the origin for the object. Furthermore, an object is intended to be a unit of information or a set of media data, such as a movie, as would be understood by one of ordinary skill in the art.

The information from the first address is combined with the information from the second address so as to form a third address 1212. The third address can be formed such that it is operable to identify both the first address and the second address 1216. A portion of the third address can be formatted in uniform resource locator (URL) format 1220. With the third address formatted, a request for the object can be received from a requesting device 1224, such as a user requesting a movie across the Internet. An attempt can be made to access the object at the first address by utilizing the third address 1228. Thus, the user can transmit the third address to a server which understands the format of the third address to be one which identifies more than one potential address for the desired object. Thus, the server makes a first attempt to retrieve the object from the first address embedded within the third address. If this attempt fails, the server can dynamically attempt to access the duplicate of the object at the second address utilizing the second address embedded within the third address 1232. Thus, the second address nested within the third address serves as a backup source for the desired object. In addition, if the entire object is not stored at the second address, the second address can serve either to provide a portion of the object or a link to an alternative source for the object information. Once the object is located, for example at the second address, this duplicate information of the object at the second address is obtained 1236. The information can then be returned via the server to the user that requested the object 1240. Furthermore, the duplicate of the object can be conveyed to the original address, i.e., the first address and copied to that location for more efficient transfer in the future 1244.

Figure 13:
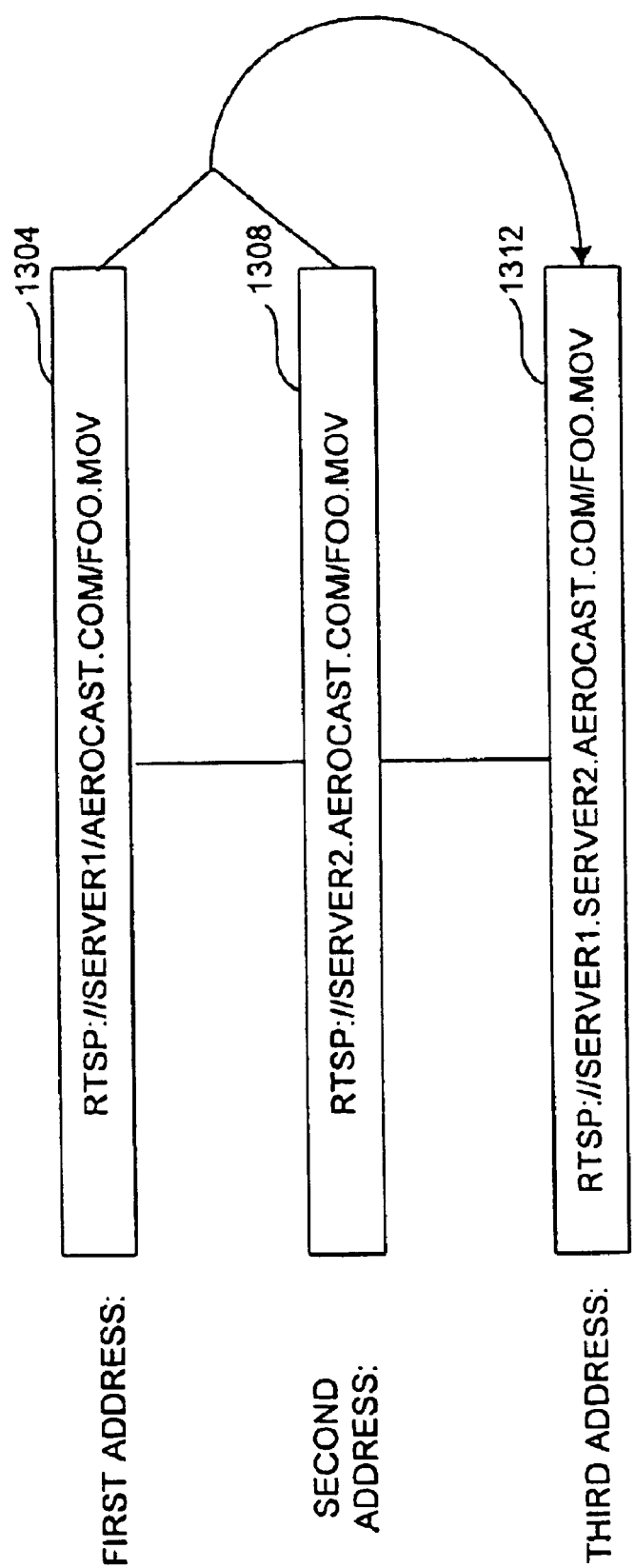
FIG. 13 is a diagram illustrating combining a first address and a second address to form a third address.

FIG. 13 illustrates an example of combining the first address and a second address to form a dynamic third address. In FIG. 13, a first address is represented as RTSP://server1.aerocast.com/foo.mov. This is standard URL format in a static addressing scheme. The second address is similarly shown in such a format as 1308, RTSP://server2.aerocast.com/foo.mov. Each of these first and second addresses is static in that it can only identify to a user a single location for the file "foo.mov." No alternative location or no metadata describing a characteristic of the foo.mov file is provided in such a format. However, the third address indicates a dynamic format in which both locations are indicated. Thus, as shown by block 1312, the first and second addresses are combined as the third address as RTSP://server1.server2.aerocast.com/foo.mov. Thus, a server receiving such an address in a multiple address system can understand that server 1 is the first server that can be accessed in the domain aerocast.com in order to attempt to access the file foo.mov. However, should such an attempt fail, an alternative source for the foo.mov file would be at server 2 under the aerocast.com domain. Thus, an alternative location for the foo.mov file is provided by the metadata "server 2."

The system illustrated in FIGS. 1 through 7a and 7b is operable to utilize such a multiple address system. For example, in FIG. 2 the block illustrated as dynamic DNS 204 is useful in providing a dynamic function in addressing various media titles desired by other elements of the system. As shown in FIG. 6, the dynamic domain name system (DNS) is operable to take an origin for a movie and combine it with what is to believed to be a current address for a movie and combine those two addresses into a single third address. Thus, when a user desires a certain movie, the first attempt to be made to obtain the movie from the first address embedded within the dynamic third address. Should that fail, the third address would indicate that the original source of the movie should be accessed as represented by the embedded second address. Thus, the dynamic DNS can operate as a database which combines both a present location (or what is believed to be a present location) for a file and an original source for that file.

Furthermore, this multiple address system can be utilized in a standard static addressing system by simply ignoring the field where the second address is embedded. Thus, by formatting an address in standard URL format, with the second address located in a location which would be ignored by the URL format, one can essentially make the second address transparent to the URL addressing system.

Port Addressing

Figure 14:
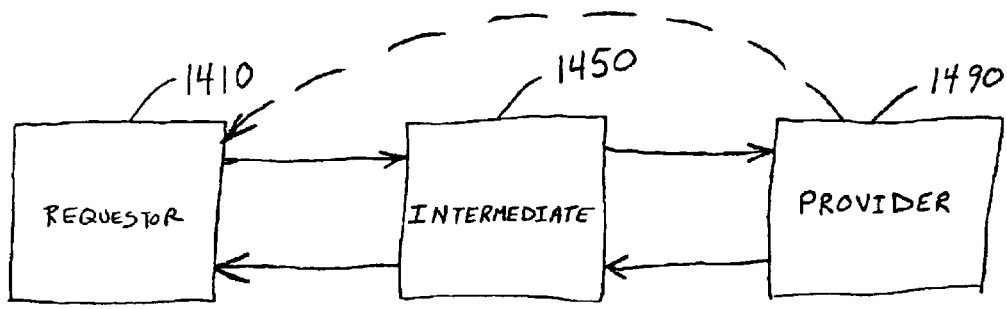
FIG. 14 illustrates a system which utilizes the same data path for requesting data and providing data between a requestor and provider.

As another example of metadata that can be included in an address, one may also include a port identifier in an address string. Ports identify the application program that process a message under a given protocol. For example, when hypertext transfer protocol (HTTP) is used, it is associated with "Port 80." Thus, by default, when a requesting device transmits an address that begins "http://" the receiving device routes the, address information to its application associated with its Port 80, i.e., the application that processes HTTP. Similarly, when the receiving device responds to the requesting device, it formats its response in accordance with the http protocol. FIG. 14 shows an example of such a system.

In FIG. 14, a requestor 1410 sends an address to an intermediate device 1450. Such an intermediate device, such as a caching server or router, then determines that it needs to request the desired information from another device that can provide the necessary data, e.g., provider 1490. For purposes of this example, the requestor 1410 utilizes HTTP protocol in addressing the intermediate device 1450 while the intermediate device 1450 utilizes RTSP protocol in addressing the provider 1490. In response to the request for the necessary data from the intermediate device 1450, the provider 1490 responds in the same protocol in which it was addressed. Thus, for purposes of his example, it responds according to the RTSP protocol. Thus, the intermediate device recognizes the RTSP header in the address and routes it to its application program designated port 3080. The intermediate device then routes the information to the requestor 1410 under the HTTP protocol, because that was the protocol in which the requester 1410 originally addressed the intermediate device 1450. Thus, such a system is able to maintain the correct protocols in transferring data as long as the same chain of devices is used. Problems arise, however, when a different data path is used in returning the requested data to the requestor. Namely, if the provider 1490 were to attempt to respond directly to the requester 1410 across the network, the provider 1490 would by default format the response in RTSP format. Thus, such a response would be directed to port 3080 of the requester. However, the Requestor 1410 is expecting the data to be received on port 80 which is the port associated with the HTTP protocol. Thus, the requested data would not be able to be communicated correctly to the requesting device when a direct connection is attempted.

Figure 15:
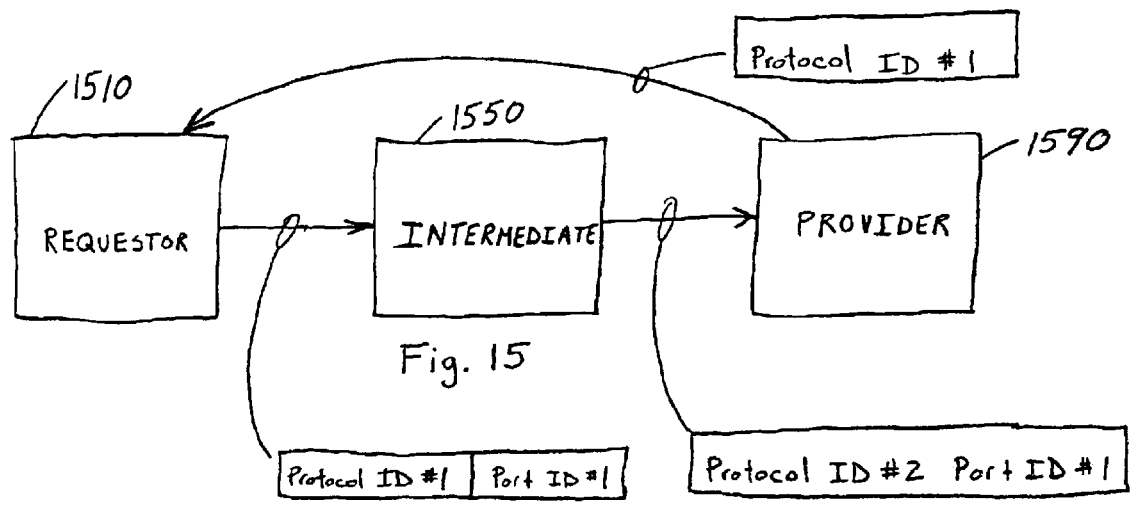
FIG. 15 illustrates an embodiment of the invention that provides port identifiers that permit alternate data paths to be utilized in requesting and sending data.

In FIG. 15, an embodiment of the invention is shown which does allow different data paths to be used. In FIG. 15, a requester 1510 addresses an intermediate device 1550. As part of the address string, the requester utilizes a first protocol (designated "PROTOCOL ID#1" in FIG. 15. In addition, the requester includes a port identifier (designated "PORT ID#1") in the address string in FIG. 15. For example, the requestor could utilize HTTP as the protocol identifier and port 80 as the port identifier. The intermediate device then processes the request and transmits an address to the provider device 1590. In transmitting this address, the intermediate device changes format to a second protocol (designated Protocol ID #2) in the address string in FIG. 15. However, the intermediate device includes the port identifier #1 as part of the address string. Thus, for example, the intermediate device 1550 could utilize RTSP as the second protocol and port 80 as the metadata in the address string. Consequently, the provider knows the protocol in which to address its response directly to the requestor 1510. This is illustrated by the line going from the Provider 1590 to the Requestor 1510. In this example, such an address would utilize HTTP, because that is the protocol associated with port 80 that was sent to the provider device 1590.

Consequently, FIG. 15 illustrates a system that is capable of transmitting port information as part of an address string. Similarly, it illustrates a way of removing intermediate devices from a return datapath.

Figures 16, 17:
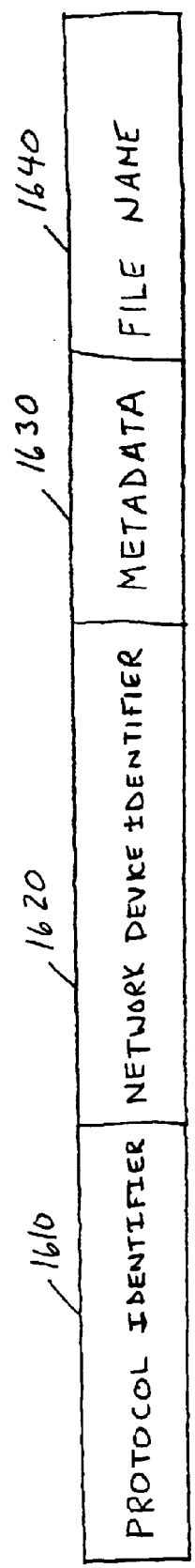
FIG. 16 illustrates an embodiment of the invention for providing a data structure comprised of metadata.
FIG. 17 illustrates an example of the data structure shown in FIG. 16.
Figure 18:
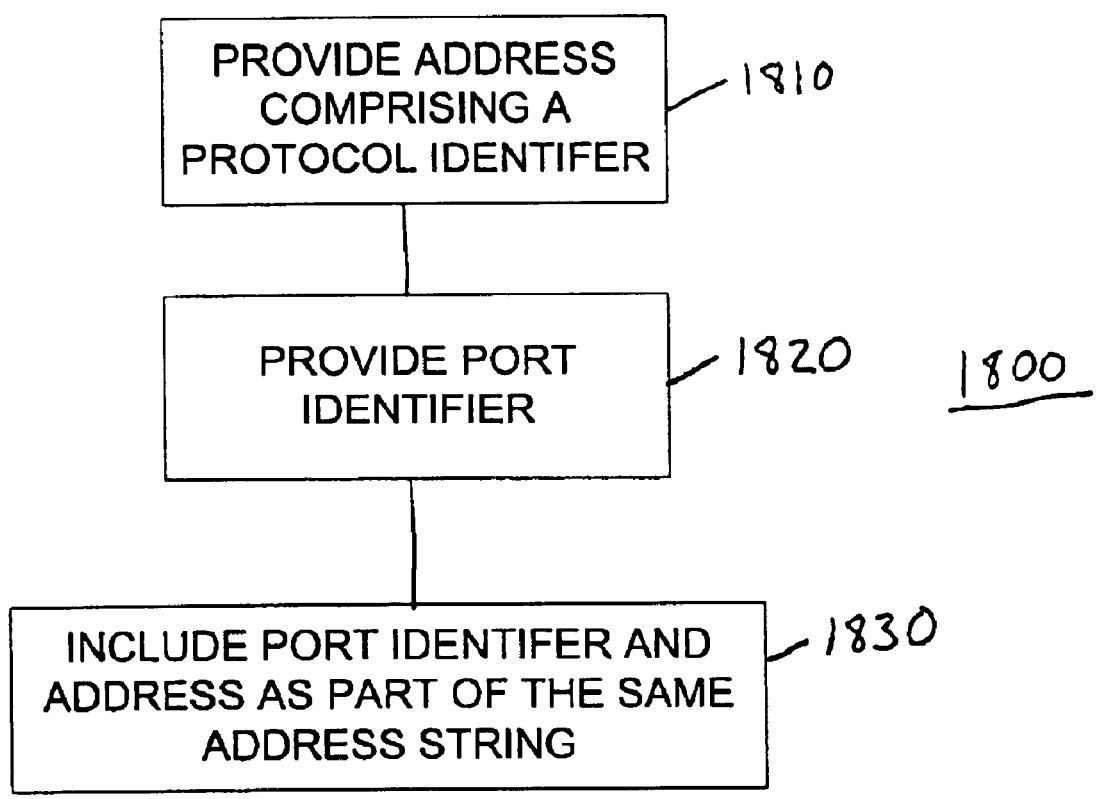
FIG. 18 illustrates a method for implementing one embodiment of the invention.

FIG. 16 illustrates one embodiment of the invention that provides a data structure for the metadata addresses. In FIG. 16, an address string 1600 is shown. The address string is comprised of a protocol identifier field 1610, a network device identifier field 1620, a metadata field 1630, and a file name field 1640. An example of an address for use in TCP/IP format is shown in FIG. 17. The address shown in FIG. 17 shows an address that utilizes HTTP as the protocol. The network device identifier is shown as an internet protocol (IP) address "204.162.80.181". The metadata field in this example is shown as "PCN_000.80." The "PCN 000" could represent header information and an alternate server identifier. The "80" is an example of a port identifier. The "FOO.DAT" is an example of a file name that is being requested from IP address "204.162.80.181". Thus, the example shown in FIG. 17 illustrates an address that provides metadata comprised of both a server ID and a port ID. As explained above, one might choose to simply include the server ID as part of the metadata. Similarly, one could include only the port ID as part of the metadata FIG. 18 illustrates a method 1800 for implementing one embodiment of the invention. In block 1810 of FIG. 18, an address is provided that comprises a protocol identifier. In block 1820, a port identifier is also provided. In block 1830, the port identifier and address string are included as part of the same address string.

Figure 19A:
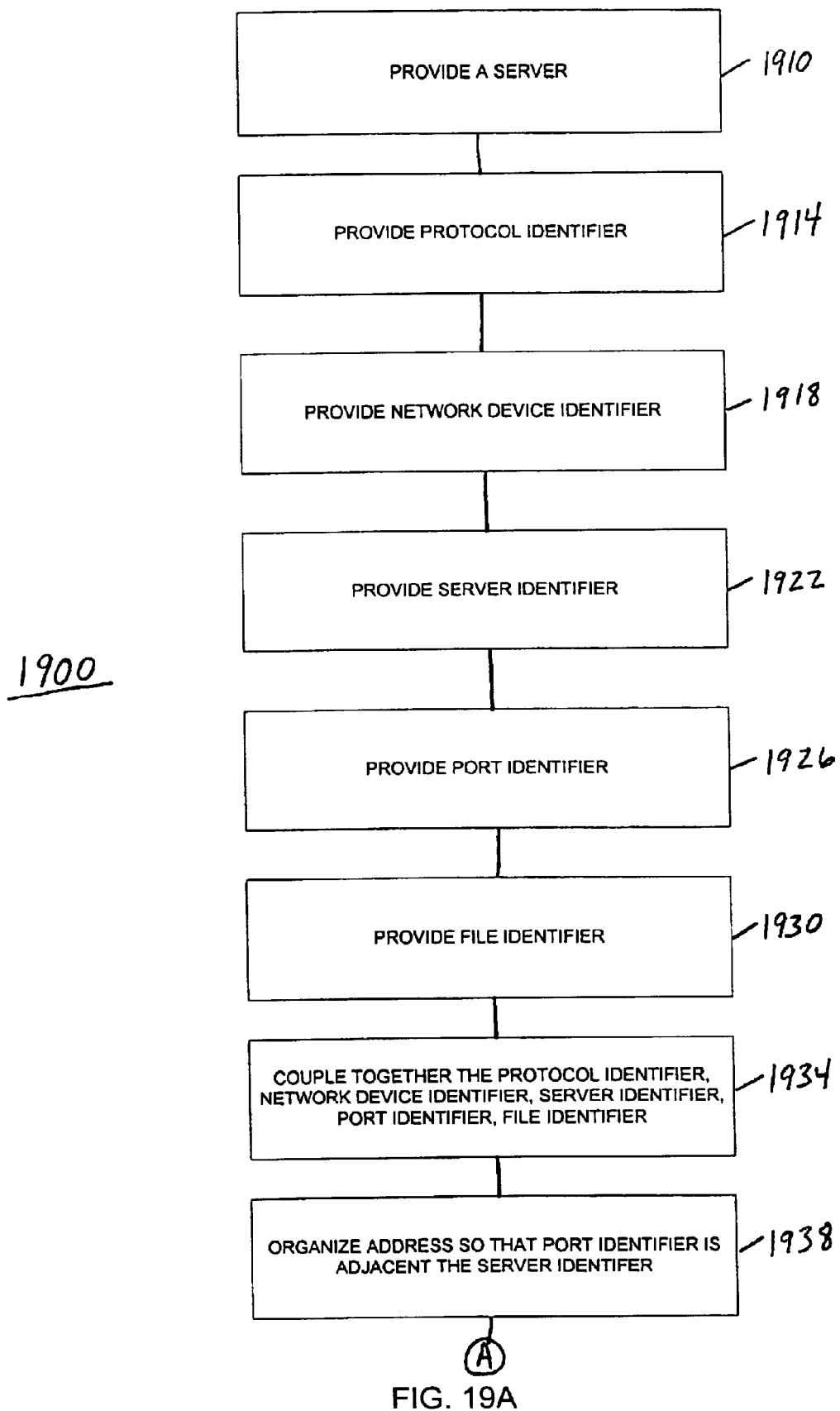
FIGS. 19a and 19b illustrate a method for implementing an embodiment of the invention.
Figure 19B:
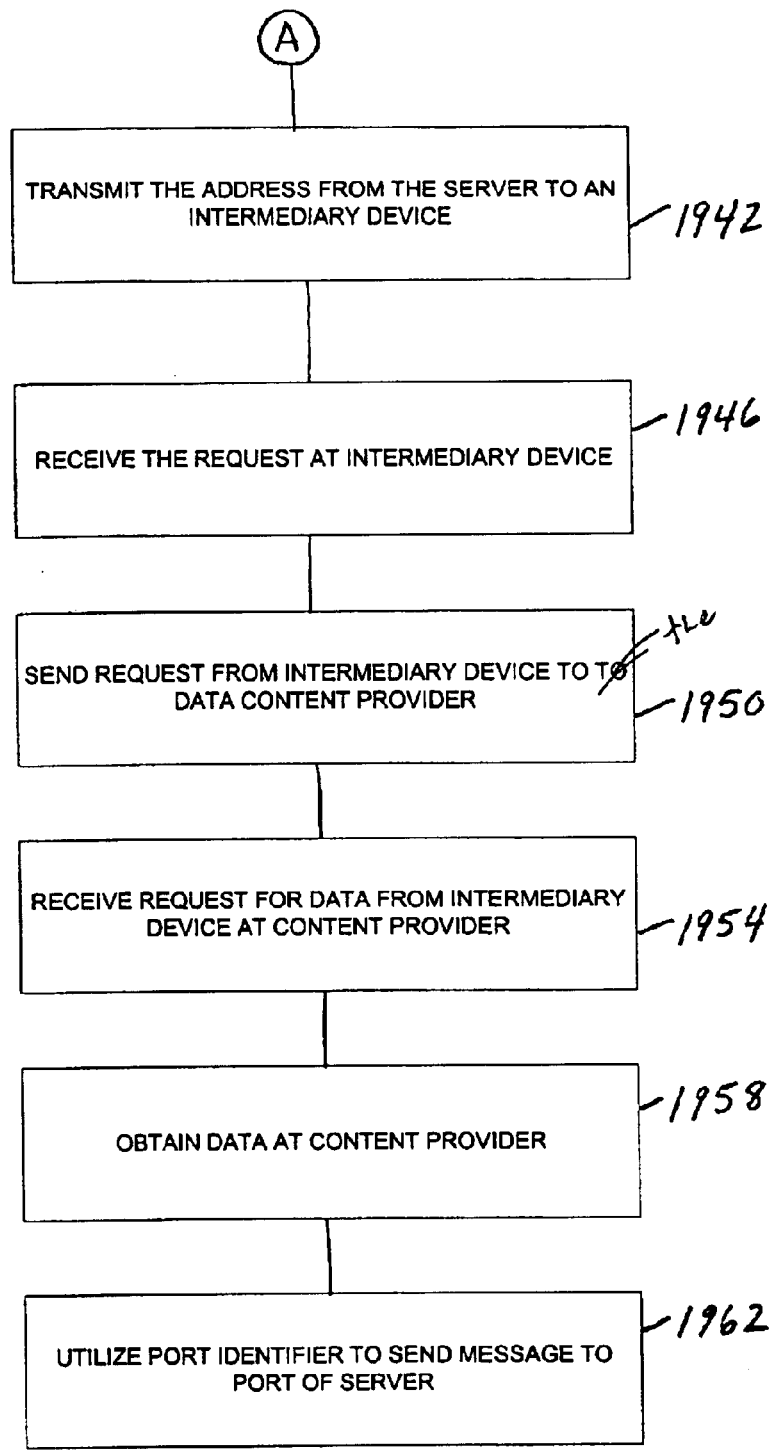

In FIGS. 19a and 19b, another embodiment of the invention is illustrated in the flowchart 1900. In block 1910, a server is provided. A protocol identifier, e.g., HTTP, RTSP, FTP, SMTP, or Telnet, is provided in block 1914. A protocol identifier is considered to be the part of an address that identifies the protocol in use with an object, such as HTTP, RTSP, NNTP, FTP, SHOUT, RTP, ACTP, and SHTP. While these are examples of some existing protocols, others will likely be developed in the future, as well. A Network Device Identifier is also provided as shown in block 1918 to identify a device such as a server that is being addressed. A network address identifier is an address that identifies a device in a network that is being addressed. Such an address can be in numerical or textual form. For example, under the Internet Protocol (IP), e.g., IP Version 4 (IPv4), it could take the form of four numbers separated by periods, e.g., "128.46.73.208". Furthermore, through the use of a lookup table, such an address can be transformed to a textual version for easier recollection by a person entering the address, e.g., "www.aerocast.com". Such an addressing system is merely a matter of choice. However, for purposes of describing this embodiment of the invention, the IPv4 system will be utilized. It should be understood, however, that this embodiment is not intended to be limited to that particular version. As another example, such a Network Device Identifier could be an Internet Protocol address, such as "204.162.80.181" or an equivalent name in the domain name system of the internet such as "AEROCAST.COM".

In block 1922, a server identifier is provided. Such a server identifier can function to identify a server which provides a backup source of data or the identification of the original requesting device. In block 1926, a port identifier is provided. As explained above, such a port identifier can identify the port to which data should be sent to a device. Examples of port identifiers are those from the "Well-known" port identifier list, such as "80" for HTTP, "23" for Telnet, "25" for SMTP (email), and "21" for FTP. A file identifier is provided in block 1930.

In block 1934, the protocol identifier, network device identifier, server identifier, port identifier and file identifier are coupled together. Furthermore, as shown in block 1938, these fields can be organized as an address so that the port identifier is arranged with other metadata such as the server identifier.

In block 1942, the address is transmitted from the server to an intermediary device. The request is received at the intermediary device in block 1946. In block 1950, the request is sent from the intermediary device to a data content provider. Either of these transmissions could involve multiple links with other intermediary devices. In block 1954, the request for data is received at the content provider, at which point the data can be obtained, as shown in block 1958. Finally, in block 1962, the port identifier can be used to send data or other message to the port of the server in accordance with the port identifier field.

While various embodiments of the invention have been described as methods or apparatus for implementing the invention. It should be understood that the invention can be implemented through code coupled to a computer, e.g., code resident on a computer or accessible by the computer. For example, software and databases could be utilized to implement many of the methods discussed above. Thus, in addition to embodiments where the invention is accomplished by hardware, it is also noted that these embodiments can be accomplished through the use of an article of manufacture comprised of a computer usable medium having a computer readable program code embodied therein, which causes the enablement of the functions disclosed in this description. Therefore, it is desired that the embodiments expressed above also be considered protected by this patent in their program code means as well.

It is also envisioned that embodiments of the invention could be accomplished as computer signals embodied in a carrier wave, as well as electrical signals propagated through a transmission medium. Thus, the various information discussed above could be formatted in a structure, such as a data structure, and transmitted as an electrical signal through a transmission medium.

It is also noted that many of the structures and acts recited herein can be recited as means for performing a function or steps for performing a function, respectively. Therefore, it should be understood that such language is entitled to cover all such structures or acts disclosed within this specification and their equivalents, including the matter incorporated by reference.

It is thought that the apparatuses and methods of the embodiments of the present invention and many of its attendant advantages will be understood from this specification and it will be apparent that various changes may be made in the form, construction and arrangement of the parts thereof without departing from the spirit and scope of the invention or sacrificing all of its material advantages, the form herein before described being merely exemplary embodiments thereof.

What is claimed is:

1. A method of providing an address, said method comprising:

providing a requesting device coupled to a network;

providing an address, said address comprising a protocol identifier;

providing a port identifier, said port identifier operable to identify a port on said requesting device;

including said port identifier as part of said address;

transmitting said address from said requesting device onto said network;

receiving said address at an intermediate device; and addressing a data provider device while including said port identifier as part of an address string.

2. The method as described in claim 1 and further comprising:

transmitting a message from said data provider to the port of said requesting device identified by said port identifier.

3. A method of providing an address, comprising:

providing a protocol identifier;

providing an IP identifier;

providing a requesting device identifier;

providing a requesting device port identifier;

coupling said protocol identifier, said IP identifier, said requesting device identifier, and said requesting device port identifier as an address string.

4. The method as described in claim 3 and further comprising:

providing a file identifier.

5. The method as described in claim 4 wherein said coupling further comprises:

coupling said protocol identifier with said IP identifier, said requesting device identifier, said requesting device port identifier, and said file identifier as an address string.

6. The method as described in claim 5 and further comprising:

organizing said address structure so that said port identifier is adjacent said requesting device identifier.

7. A data structure for addressing a device on a network, said data structure comprising:

a protocol identifier field;

an internet protocol identifier field for use in addressing an intermediary device;

a requesting device identifier field;

a requesting device port identifier field; and wherein said protocol identifier field, said internet protocol identifier field, said requesting device identifier field, and said requesting device port identifier field are combined as part of an address string.

8. The data structure as described in claim 7 wherein said internet protocol identifier field is located between said protocol identifier field and said requesting device identifier field.

9. The data structure as described in claim 7 wherein said requesting device identifier field is located between said protocol identifier field and said internet protocol identifier field.

10. The data structure as described in claim 7 wherein said requesting device port identifier field is located adjacent said requesting device identifier field.

11. The data structure as described in claim 7 and further comprising a file identifier field for identifying a file stored on a data provider device.

12. A computer data signal comprising:

a protocol identifier segment;

an internet protocol identifier segment for use in addressing an intermediary device;

a requesting device identifier segment;

a requesting device port identifier segment;

wherein said protocol identifier segment, said internet protocol identifier segment; said requesting device identifier segment, and said requesting device port identifier segment are configured as part of an address string.

13. The computer data signal as described in claim 12 and further comprising:

a file identifier segment for identifying a file stored on a data provider device.

14. The computer data signal as described in claim 12 wherein said requesting device port identifier segment is operable for designating a port on a requesting device from which a request for data originated.

15. An apparatus for use in a network, said apparatus comprising:

a computer operable to provide an address for addressing a device on said network;

code for use by said computer operable to provide a protocol identifier field;

code for use by said computer operable to provide an internet protocol identifier field for use in addressing an intermediary device;

code for use by said computer operable to provide a requesting device identifier field;

code for use by said computer operable to provide a requesting device port identifier field;

code for use by said computer operable to configure said protocol identifier field, said internet protocol identifier field, said requesting device identifier field, and said requesting device port identifier field as a single address.

16. The apparatus as described in claim 15 and further comprising:

code for use by said computer operable to provide a file identifier field.

17. The apparatus as described in claim 16 wherein said code for use by said computer operable to configure said protocol identifier field, said internet protocol identifier field, said requesting device identifier field, and said requesting device port identifier field as a single address comprises:

code for use by said computer operable to configure said protocol identifier field, said internet protocol identifier field, said requesting device identifier field, said requesting device port identifier field, and said file identifier field as a single address.

* * * * *

UNITED STATES PATENT AND TRADEMARK OFFICE
CERTIFICATE OF CORRECTION

PATENT NO. : 6,836,806 B1
DATED : December 28, 2004
INVENTOR(S) : Raciborski, Nathan et al.

It is certified that error appears in the above-identified patent and that said Letters Patent is hereby corrected as shown below:

Column 9,
Line 46, the second and fifth word "chum" should read -- churn --.

Signed and Sealed this

Fifth Day of April, 2005

JON W. DUDAS
*Director of the United States Patent and Trademark Office*